(12) United States Patent
Qu et al.

(10) Patent No.: US 12,445,985 B2
(45) Date of Patent: *Oct. 14, 2025

(54) TIMING METHOD FOR DEALING WITH LINK EXCEPTION AND APPARATUS

(71) Applicant: HUAWEI TECHNOLOGIES CO., LTD., Shenzhen (CN)

(72) Inventors: Kaiyang Qu, Hangzhou (CN); Xiaoying Xu, Shenzhen (CN); Qiang Fan, Shanghai (CN); Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

This patent is subject to a terminal disclaimer.

(21) Appl. No.: 18/160,033

(22) Filed: Jan. 26, 2023

(65) Prior Publication Data
US 2023/0171721 A1    Jun. 1, 2023

Related U.S. Application Data

(63) Continuation of application No. PCT/CN2020/105960, filed on Jul. 30, 2020.

(51) Int. Cl.
*H04W 56/00*    (2009.01)
*H04W 76/11*    (2018.01)

(52) U.S. Cl.
CPC ........ *H04W 56/0015* (2013.01); *H04W 76/11* (2018.02)

(58) Field of Classification Search
CPC .......................... H04W 56/0015; H04W 76/11
See application file for complete search history.

(56) References Cited

U.S. PATENT DOCUMENTS

2020/0259896 A1* 8/2020 Sachs ..................... H04L 67/12

FOREIGN PATENT DOCUMENTS

CN        111211852 A  *  5/2020  ........ H04W 56/0015
WO      2020071866 A1     4/2020
(Continued)

OTHER PUBLICATIONS

Nokia, Nokia Shanghai Bell, Tencent, Huawei, Vertical_LAN TSN related CR for non-FASMO corrections. SA WG2 Meeting #137E, Elbonia, Feb. 24-27, 2020, S2-2002212, 23 pages.
(Continued)

*Primary Examiner* — Saad A. Waqas
(74) *Attorney, Agent, or Firm* — HAUPTMAN HAM, LLP

(57) ABSTRACT

Embodiments of this application relate to the field of communication technologies, and provide a timing method for dealing with a link exception and an apparatus. A specific solution is as follows: receiving a first synchronization packet from a first terminal device; receiving a second synchronization packet from a second terminal device or a server; and if the first synchronization packet and the second synchronization packet belong to a same TSN domain, determining a to-be-forwarded synchronization packet in the first synchronization packet and the second synchronization packet. In this way, if the to-be-forwarded packet is the first synchronization packet, the first synchronization packet is forwarded, and the second synchronization packet is filtered. Embodiments of this application are used to improve timing precision in a timing process of the TSN device for the 5GS.

14 Claims, 21 Drawing Sheets

(56) References Cited

FOREIGN PATENT DOCUMENTS

| WO | 2020081388 | A1 | | 4/2020 | |
|----|-----------|----|---|--------|---|
| WO | WO-2020103540 | A1 | * | 5/2020 | ............ H04W 36/00 |
| WO | WO-2020104953 | A1 | * | 5/2020 | ............ H04L 69/28 |
| WO | WO-2021033114 | A1 | * | 2/2021 | ........ H04W 56/0015 |
| WO | WO-2021181363 | A1 | * | 9/2021 | ........ H04W 56/0065 |
| WO | WO-2021190192 | A1 | * | 9/2021 | ............ H04J 3/0667 |

OTHER PUBLICATIONS

3GPP TR 23.700-20 V0.4.0 (Jun. 2020), 3rd Generation Partnership Project; Technical Specification Group Services and System Aspects; Study on enhanced support of Industrial Internet of Things (IIoT) in the 5G System (5GS) (Release 17), 56 pages.

3GPP TS 23.501 V16.5.0 (Jul. 2020), 3rd Generation Partnership Project; Technical Specification Group Services and System Aspects; System architecture for the 5G System (5GS); Stage 2(Release 16), 441 pages.

3GPP TS 23.502 V16.5.0 (Jul. 2020), 3rd Generation Partnership Project; Technical Specification Group Services and System Aspects; Procedures for the 5G System (5GS); Stage 2(Release 16), 594 pages.

3GPP TS 24.535 V16.1.0 (Jun. 2020), 3rd Generation Partnership Project; Technical Specification Group Core Network and Terminals; 5G System (5GS); Device-Side Time Sensitive Networking (TSN) Translator (DS-TT) to Network-Side TSN Translator (NW-TT) protocol aspects; Stage 3(Release 16), 10 pages.

International Search Report issued in corresponding International Application No. PCT/CN2020/105960, mailed Mar. 24, 2021, pp. 1-9.

SA WG2 Meeting #S2-131, S2-1902927, "5G system support for multiple external time domains: Option 3", Ericsson, Feb. 25-Mar. 1, 2019, Santa Cruz—Tenerife, total 6 pages.

Chinese Office Action issued in corresponding Chinese Application No. 202080104678.8, dated Dec. 14, 2024, pp. 1-13.

* cited by examiner

TIMING METHOD FOR DEALING WITH LINK EXCEPTION AND APPARATUS

CROSS-REFERENCE TO RELATED APPLICATIONS

This application is a continuation of International Application No. PCT/CN2020/105960, filed on Jul. 30, 2020, the disclosure of which is hereby incorporated by reference in its entirety.

TECHNICAL FIELD

Embodiments of this application relate to the field of communication technologies, and in particular, to a timing method for dealing with a link exception and an apparatus.

BACKGROUND

In an industrial control scenario, control signaling sent by a master node may arrive at a slave node within a specified period, and the slave node may perform an action indicated by the control signaling at a specified time point. Therefore, a network in the industrial control scenario is usually a time sensitive network (TSN).

For the TSN, a 5th generation mobile network system (5GS) may be considered as a TSN bridge, and a service data packet of the TSN may be sent in uplink/downlink through the 5GS. In addition, for the TSN, the 5GS may also be considered as a transparent clock (TC). To ensure stability and reliability of a time synchronization service, the TSN configures one master clock and one standby clock for each TSN domain. When and only when the master clock is faulty or a link exception occurs, the standby clock takes effect and starts to send a synchronization packet flow for an entire TSN topology. A protocol specifies that in each TSN domain, only one time synchronization source is allowed at a moment. When the master clock works normally, a TSN device in which the master clock is located sends a synchronization packet flow to the entire TSN topology structure, and a "target clock" (clock target) corresponding to the standby clock receives periodic master clock signals as sleep instructions. Once the master clock fails and the "target clock" does not receive continuous sleep instructions, the standby clock is triggered to be enabled. The standby clock starts to take over a role of the master clock and sends a synchronization packet flow to the entire TSN topology.

In other words, whether to enable the standby clock is determined by a TSN device of the standby master clock. In this case, once the standby clock does not receive continuous sleep instructions, the standby clock is autonomously enabled. However, a dual-master-clock phenomenon is easy to occur in this manner. This is because the standby clock cannot determine whether an uplink air interface link on a master clock side or a downlink air interface link on a standby clock side is faulty. Once the uplink air interface link on the master clock side is normal but the downlink air interface link on the standby clock side is abnormal, the standby clock mistakenly considers that a fault occurs on the master clock side and mistakenly enables the standby clock to send a synchronization packet flow. If the 5GS is used as the TC, the entire 5GS is considered as a network element, and forwards a synchronization packet but does not perform filtering operations such as opening, reading, or identification. As a result, two timing clock signals may simultaneously occur in the TSN. Because an error may be introduced between different clock sources, when a TSN device receives timing signals from a plurality of clock sources, synchronization precision of the TSN device may be reduced. In addition, if the 5GS forwards a plurality of redundant TSN timing signals, unnecessary air interface overheads are inevitably increased.

SUMMARY

Embodiments of this application provide a timing method for dealing with a link exception and an apparatus, to avoid a dual-master-clock phenomenon in a TSN domain, improve synchronization precision of a TSN device, and reduce air interface overheads of a 5GS.

To achieve the foregoing objectives, the following technical solutions are used in embodiments of this application.

According to a first aspect, a timing method for dealing with a link exception is provided. The method may be applied to a core network device or a chip in the core network device. The method includes: receiving a first synchronization packet from a first terminal device; receiving a second synchronization packet from a second terminal device or a server; and if the first synchronization packet and the second synchronization packet belong to a same TSN domain, determining a to-be-forwarded synchronization packet in the first synchronization packet and the second synchronization packet. In this way, if the to-be-forwarded packet is the first synchronization packet, the first synchronization packet is forwarded, and the second synchronization packet is filtered; if the to-be-forwarded packet is the second synchronization packet, the second synchronization packet is forwarded, and the first synchronization packet is filtered. The core network device may be a UPF.

In an existing timing solution, when a standby clock cannot receive a sleep instruction sent by a master clock, the standby clock considers that the master clock is faulty. However, the standby clock cannot determine whether an uplink air interface link on a master clock side is faulty or a downlink air interface link on a standby clock side is faulty. Once the air interface link of the master clock is normal but the downlink air interface link of the standby clock is abnormal (which may be understood as being intermittent), the standby clock mistakenly considers that a fault occurs on the master clock side, and mistakenly enables the standby clock and uploads a synchronization packet to the UPF. As a result, synchronization precision of a slave clock is affected.

However, in this application, if the core network device receives both a synchronization packet of a master clock and a synchronization packet of a standby clock in a same TSN domain, the core network device may determine a to-be-forwarded synchronization packet and a to-be-filtered synchronization packet in the two synchronization packets. In other words, the core network device determines whether to enable the standby clock by determining the synchronization packet to be forwarded at this time. Compared with a current technology in which the core network device does not perform operations such as opening and reading on the to-be-forwarded synchronization packet but only forwards the synchronization packet, the core network device in this application may determine the to-be-forwarded synchronization packet in the two synchronization packets. This avoids delivering both the two packets to a TSN server or an air interface, reduces signaling exchange and air interface overheads, and improves synchronization precision of a slave clock.

In a possible design, that the first synchronization packet and the second synchronization packet belong to a same TSN domain includes: A virtual local area network VLAN identifier VID carried in the first synchronization packet is the same as a VID carried in the second synchronization packet, in other words, if synchronization packets sent by terminal devices or servers belonging to a same VLAN carry a same VID, the synchronization packets belong to a same TSN domain. Alternatively, a TSN domain number carried in a packet header of the first synchronization packet is the same as a TSN domain number carried in the second synchronization packet, in other words, synchronization packets in a same TSN domain carry a same TSN domain number. Alternatively, an address of the first terminal device carried in the first synchronization packet and an address of the second terminal device or the server carried in the second synchronization packet both belong to the TSN domain. The address may be an IP address, a MAC address, or the like, and a binding relationship between an address and a TSN domain may be notified to the network device through capability reporting when the terminal device or the server establishes a connection to the network device.

In a possible design, the determining a to-be-forwarded synchronization packet in the first synchronization packet and the second synchronization packet includes: determining, based on a clock address carried in the first synchronization packet and a clock address carried in the second synchronization packet, the to-be-forwarded synchronization packet in the first synchronization packet and the second synchronization packet.

The first synchronization packet may correspond to one source address and a plurality of destination addresses, and the second synchronization packet may also correspond to one source address and a plurality of destination addresses. The source address is an address of a master clock or an address of a standby master clock, and the destination address is an address of a slave clock for which timing needs to be performed. When initially accessing a 5GS, the master clock, the standby clock, and the slave clock may be bound to fixed IP/MAC addresses, and information about the master clock and the standby clock and information about bounded addresses are reported to a core network element (for example, the UPF/an SMF/an AMF). Therefore, once receiving the synchronization packets with two different addresses in the same TSN domain, the UPF may compare IP/MAC addresses of the received synchronization packets in the TSN domain with the address of the master clock and the address of the standby clock that are prestored in the TSN domain, to determine the to-be-forwarded synchronization packet in the first synchronization packet and the second synchronization packet.

Based on the foregoing manner of determining the to-be-forwarded synchronization packet, in a possible design, a result may be as follows: The clock address carried in the first synchronization packet is the address of the master clock, and the clock address carried in the second synchronization packet is the address of the standby clock; or the clock address carried in the first synchronization packet is the address of the standby clock, and the clock address carried in the second synchronization packet is the address of the master clock.

In a possible design, the determining a to-be-forwarded synchronization packet in the first synchronization packet and the second synchronization packet includes: determining, based on a preconfigured filter template, the to-be-forwarded synchronization packet in the first synchronization packet and the second synchronization packet, where the filter template includes information about a master clock and/or information about a standby clock.

In other words, the filter template may be preconfigured in the core network device, and some information about the master clock and/or some information about the standby clock are/is set in the template. When synchronization packets of the two clocks are received, clock information carried in the synchronization packets may be compared with clock information in the filter template, to determine a packet of the master clock and a packet of the standby clock in the two synchronization packets.

In a possible design, the information about the master clock includes at least one of a source address or an internet protocol version 6 IPv6 prefix of the master clock, and the information about the standby clock includes at least one of a destination address or an IPv6 prefix of the clock.

In this way, addresses or IPv6 prefixes of the received synchronization packets may be compared with addresses or IPv6 prefixes in the filter template, to determine the packet of the master clock and the packet of the standby clock.

In a possible design, the determining a to-be-forwarded synchronization packet in the first synchronization packet and the second synchronization packet includes: when an interval of a first time period is between a time point at which the second synchronization packet is received and a time point at which the $1^{st}$ first synchronization packet is received, and the first time period is greater than or equal to a preset time period, determining that the first synchronization packet is the to-be-forwarded synchronization packet.

It may be understood that a timer may be maintained in the UPF. Considering that a mistakenly triggered synchronization packet of a standby clock is occasional, the UPF does not receive, within a time period after receiving a synchronization packet sent by a master clock, a synchronization packet sent by another clock. Therefore, a timer dedicated to maintaining a service related to a master clock may be introduced in the UPF. Once the UPF receives the $1^{st}$ TSN timing packet of a node in a TSN domain, the timer is started. If the UPF does not receive, within a preset time period, a TSN packet sent by another node, the UPF may consider that the $1^{st}$ timing packet is a packet sent by a master clock, and correspondingly consider that a TSN packet that is sent by another node in the same TSN domain and that is received outside the preset time period is a mistakenly triggered TSN timing packet, so that the UPF performs a filtering operation on the mistakenly triggered timing packet.

In a possible design, before the determining a to-be-forwarded synchronization packet in the first synchronization packet and the second synchronization packet, the method further includes: sending the first synchronization packet and the second synchronization packet to an access and mobility management function AMF network element; and receiving first indication information from the AMF network element, where the first indication information indicates that the first synchronization packet and the second synchronization packet are valid.

This is considered that a plurality of synchronization packets received by the UPF may be malicious attack packets. Therefore, before the to-be-forwarded synchronization packet is determined, validity of the first synchronization packet and the second synchronization packet needs to be first determined.

According to a second aspect, a timing method for dealing with a link exception is provided. The method is applied to an access network device or a chip in the access network device. The method includes: determining that a timing link on a master clock side in a time sensitive network TSN domain is abnormal; and sending first request information to the TSN domain, where the first request information indicates to replace a master clock in the TSN domain with a standby clock in the TSN domain.

The access network device may be a gNB in a 5GS. In other words, the gNB may determine whether the timing link of the master clock in the TSN domain is abnormal, and if determining that the timing link is abnormal, the gNB may indicate the standby clock to replace the master clock. Compared with a current technology in which the 5GS only forwards a synchronization packet, but does not participate in determining whether the link is abnormal and participate in indicating whether to enable the standby clock, in this application, the gNB in the 5GS may be assigned with a role of sensing a link exception and indicating to enable the standby clock. In this way, a 5G air interface link disconnection problem can be resolved more quickly and directly, and a risk of timing interruption in a TSN network can be reduced.

In a possible design, before the determining that a timing link on a master clock side in a time sensitive network TSN domain is abnormal, the method further includes: receiving first capability information from a first terminal device and second capability information from a second terminal device, where the first capability information indicates that a first time sensitive network TSN node connected to the first terminal device has a synchronous timing capability, the first TSN node is the master clock, the second capability information indicates that a second TSN node connected to the second terminal device has a timing capability, and the second TSN node is the standby clock.

The terminal devices may report the capacity information in processes in which the first terminal device and the second terminal device establish or update PDU sessions with the access network device. To be specific, the first terminal device and the second terminal device may send capability indications to the access network device, where the capability indications include the capability information. In this way, the access network device may determine, based on the capability information in a subsequent process of forwarding the synchronization packet, whether the link is abnormal.

In a possible design, the determining that a timing link on a master clock side in a time sensitive network TSN domain is abnormal includes: If the access network device receives no synchronization packet from the first terminal device within a preset time period, the access network device determines that the timing link on the master clock side is abnormal.

In other words, a timer may be maintained in the gNB. If the gNB determines that no synchronization packet from the first terminal device is received within a preset time period of the timer, the gNB may consider that the timing link on the master clock side is abnormal.

In a possible design, the determining that a timing link on a master clock side in a time sensitive network TSN domain is abnormal includes: analyzing, through an artificial intelligence AI module, a factor that affects a signal of the first terminal device; and when an analysis result is that no synchronization packet from the first terminal device can be received within a future preset time period, determining that the timing link on the master clock side in the TSN domain is abnormal.

For example, through the AI module, the gNB may analyze parameters such as a weather forecast and a vehicle traffic volume, predict a factor, for example, air interface channel quality, that affects a receiving channel of UE 1, and determine whether a synchronization packet from the first terminal device can be received within the future preset time period. If determining that no synchronization packet from the first terminal device can be received within the future preset time period, the gNB determines that the timing link on the master clock side is abnormal.

In a possible design, the determining that a timing link on a master clock side in a time sensitive network TSN domain is abnormal includes: when receiving second request information from the first terminal device, where the second request information indicates to replace the master clock, determining that the timing link on the master clock side in the TSN domain is abnormal.

In this design, the first terminal device may determine whether the master clock needs to be replaced. If determining that the master clock needs to be replaced, the first terminal device may send a second request message to the gNB, to indicate to replace the master clock. The gNB may determine, based on the second request message, that the timing link on the master clock side is abnormal. In other words, the gNB is passively notified that the link of the master clock is abnormal.

In a possible design, the determining that a timing link on a master clock side in a time sensitive network TSN domain is abnormal includes: receiving third request information from the second terminal device, where the third request information indicates to replace the master clock; and when the third request information is valid, determining that the timing link on the master clock side in the TSN domain is abnormal.

In this design, the second terminal device may determine whether the master clock needs to be replaced. If determining that the master clock needs to be replaced, the second terminal device may send a third request message to the gNB, to indicate to replace the master clock. The gNB may determine, based on the third request message, that the timing link on the master clock side is abnormal. In other words, the gNB is passively notified that the link of the master clock is abnormal. In this design, to avoid a dual-clock phenomenon, when receiving the third request message, the gNB may first determine validity of the third request message. If the third request message is not malicious attack information, and the gNB receives no synchronization packet of the master clock within a specific time period, the gNB may consider that the third request message is valid, and may enable the standby clock.

In a possible design, the sending first request information to the TSN domain includes: sending the first request information to the second terminal device in the TSN domain. In other words, when determining that the standby clock needs to be enabled, the gNB may send a request for enabling the standby clock to the second terminal device on a standby clock side.

It may be understood that the second terminal device in the second aspect may alternatively be replaced with a server.

According to a third aspect, a timing method for dealing with a link exception is provided. The method is applied to a core network device or a chip in the core network device. The method includes: determining that a timing link on a master clock side in a time sensitive network TSN domain is abnormal; and sending first request information to the TSN domain, where the first request information indicates to replace a master clock in the TSN domain with a standby clock in the TSN domain. The core network device may be a UPF or the like.

Therefore, in this embodiment of this application, when the timing link on the master clock side is abnormal, the UPF in a 5GS may be assigned with a role of sensing a link exception and indicating to enable the standby clock. In this way, a 5G air interface link disconnection problem can be resolved more quickly and directly, and a risk of timing interruption in a TSN network can be reduced.

In a possible design, before the determining that a timing link on a master clock side in a time sensitive network TSN domain is abnormal, the method further includes: receiving first capability information from a first terminal device and second capability information from a second terminal device, where the first capability information indicates that a first time sensitive network TSN node connected to the first terminal device has a synchronous timing capability, the first TSN node is the master clock, the second capability information indicates that a second TSN node connected to the second terminal device has a timing capability, and the second TSN node is the standby clock.

The terminal devices may report the capacity information in processes in which the first terminal device and the second terminal device establish or update PDU sessions with the core network device. To be specific, the first terminal device and the second terminal device may send capability indications to the core network device, where the capability indications include the capability information. In this way, the core network device may determine, based on the capability information in a subsequent process of forwarding a synchronization packet, whether the link is abnormal.

In a possible design, the determining that a timing link on a master clock side in a time sensitive network TSN domain is abnormal includes: If the core network device receives no synchronization packet from the first terminal device within a preset time period, the core network device determines that the timing link on the master clock side is abnormal.

It other words, a timer may be maintained in the UPF. When the UPF determines that no synchronization packet from UE 1 is received within a preset time period of timing of the timer, the UPF may consider that the timing link on the master clock side is abnormal.

In a possible design, the determining that a timing link on a master clock side in a time sensitive network TSN domain is abnormal includes: receiving second request information from the first terminal device or the second terminal device, where the second request information indicates to replace the master clock; and when the second request information is valid, determining that the timing link on the master clock side in the TSN domain is abnormal. Similar to the solution for the gNB, determining that the second request information is valid is to avoid a dual-clock phenomenon.

In a possible design, the sending first request information to the TSN domain includes: sending the first request information to the second terminal device in the TSN domain. In other words, when determining that the link on the master clock side is abnormal, the UPF may send request information for enabling the standby clock to the terminal device on a standby clock side.

It may be understood that the second terminal device in the third aspect may alternatively be a server.

According to a fourth aspect, a timing method for dealing with a link exception is provided. The method is applied to a terminal device. The method includes: determining that a timing link on a master clock side in a time sensitive network TSN domain is abnormal; and sending first request information to a core network device, where the first request information indicates to replace a master clock in the TSN domain with a standby clock in the TSN domain.

Therefore, in this embodiment of this application, when the timing link on the master clock side is abnormal, a terminal device on the master clock side or a terminal device on a standby clock side in a 5GS may be assigned with a role of sensing a link exception and indicating to enable the standby clock. In this way, a 5G air interface link disconnection problem can be resolved more quickly and directly, and a risk of timing interruption in a TSN network can be reduced.

In a possible design, before the determining that a timing link on a master clock side in a time sensitive network TSN domain is abnormal, first capability information is sent to the core network device, where the first capability information indicates that a first TSN node connected to the terminal device has a synchronous timing capability, and the first TSN node is the master clock. In this way, when the terminal device determines that the link on the master clock side is abnormal, the core network device may determine, based on the reported capability information and an indication of the terminal device for indicating to enable the standby clock, to enable the standby clock.

In a possible design, the determining that a timing link on a master clock side in a time sensitive network TSN domain is abnormal includes: when no synchronization packet from the master clock is received within a preset time period, determining that the timing link on the master clock side is abnormal.

When the method is applied to the terminal device on the master clock side, if a timer is maintained in the terminal device on the master clock side, once the terminal device on the master clock side determines that no synchronization packet of a TSN node on the master clock side is received within a preset time period of timing of the timer, the terminal device on the master clock side considers that the timing link on the master clock side is abnormal.

In a possible design, before the determining that a timing link on a master clock side in a time sensitive network TSN domain is abnormal, the method further includes: sending second capability information to the core network device, where the second capability information indicates that a second TSN node connected to the terminal device has a timing capability, and the second TSN node is the standby clock.

In a possible design, the determining that a timing link on a master clock side in a time sensitive network TSN domain is abnormal includes: when no synchronization packet from the master clock of an access network device is received within a preset time period, determining that the timing link on the master clock side is abnormal.

To be specific, when the method is applied to the terminal device on the standby clock side, a timer may also be maintained in the terminal device on the standby clock side. The terminal device on the standby clock side needs to periodically receive a sleep instruction of the master clock sent by a gNB, and send the sleep instruction to the standby clock, to prevent the standby clock from being enabled. Therefore, once the terminal device on the standby clock side receives, within a preset time period of timing of the timer, no sleep instruction sent by the gNB, the terminal device on the standby clock side determines that the timing link on the master clock side is abnormal.

It may be understood that the second terminal device in the fourth aspect may alternatively be a server.

According to a fifth aspect, a core network device is provided. The core network device includes: a transceiver, configured to receive a first synchronization packet from a first terminal device, where the transceiver is further configured to receive a second synchronization packet from a second terminal device or a server; and a processor, configured to: if the first synchronization packet and the second synchronization packet belong to a same TSN domain, determine a to-be-forwarded synchronization packet in the first synchronization packet and the second synchronization packet.

In a possible design, that the first synchronization packet and the second synchronization packet belong to a same TSN domain includes: a virtual local area network VLAN identifier VID carried in the first synchronization packet is the same as a VID carried in the second synchronization packet; a TSN domain number carried in a packet header of the first synchronization packet is the same as a TSN domain number carried in the second synchronization packet; or an address of the first terminal device carried in the first synchronization packet and an address of the second terminal device or the server carried in the second synchronization packet both belong to the TSN domain.

In a possible design, the processor is configured to determine, based on a clock address carried in the first synchronization packet and a clock address carried in the second synchronization packet, the to-be-forwarded synchronization packet in the first synchronization packet and the second synchronization packet.

In a possible design, the clock address carried in the first synchronization packet is an address of a master clock, and the clock address carried in the second synchronization packet is an address of a standby clock; or the clock address carried in the first synchronization packet is an address of a standby clock, and the clock address carried in the second synchronization packet is an address of a master clock.

In a possible design, the processor is configured to determine, based on a preconfigured filter template, the to-be-forwarded synchronization packet in the first synchronization packet and the second synchronization packet, where the filter template includes information about a master clock and/or information about a standby clock.

In a possible design, the information about the master clock includes at least one of a source address or an internet protocol version 6 IPv6 prefix of the master clock, and the information about the standby clock includes at least one of a destination address or an IPv6 prefix of the clock.

In a possible design, the processor is configured to: when an interval of a first time period is between a time point at which the second synchronization packet is received and a time point at which the $1^{st}$ first synchronization packet is received, and the first time period is greater than or equal to a preset time period, determine that the first synchronization packet is the to-be-forwarded synchronization packet.

In a possible design, the transceiver is further configured to: send the first synchronization packet and the second synchronization packet to an access and mobility management function AMF network element; and receive first indication information from the AMF network element, where the first indication information indicates that the first synchronization packet and the second synchronization packet are valid.

According to a sixth aspect, an access network device is provided. The access network device includes a processor and a transceiver. The processor is configured to determine that a timing link on a master clock side in a time sensitive network TSN domain is abnormal. The transceiver is configured to send first request information to the TSN domain, where the first request information indicates to replace a master clock in the TSN domain with a standby clock in the TSN domain.

In a possible design, the transceiver is further configured to receive first capability information from a first terminal device and second capability information from a second terminal device, where the first capability information indicates that a first time sensitive network TSN node connected to the first terminal device has a synchronous timing capability, the first TSN node is the master clock, the second capability information indicates that a second TSN node connected to the second terminal device has a timing capability, and the second TSN node is the standby clock.

In a possible design, the processor is configured to: if the access network device receives no synchronization packet from the first terminal device within a preset time period, determine that the timing link on the master clock side is abnormal.

In a possible design, the processor is configured to: analyze, through an artificial intelligence AI module, a factor that affects a signal of the first terminal device; and when an analysis result is that no synchronization packet from the first terminal device can be received within a future preset time period, determine that the timing link on the master clock side in the TSN domain is abnormal.

In a possible design, the processor is configured to: when the transceiver is configured to receive second request information from the first terminal device, where the second request information indicates to replace the master clock, determine that the timing link on the master clock side in the TSN domain is abnormal.

In a possible design, the processor is configured to: when the transceiver is configured to receive third request information from the second terminal device, where the third request information indicates to replace the master clock, determine, when the third request information is valid, that the timing link on the master clock side in the TSN domain is abnormal.

In a possible design, the transceiver is configured to send the first request information to the second terminal device in the TSN domain.

According to a seventh aspect, a core network device is provided. The core network device includes: a processor, configured to determine that a timing link on a master clock side in a time sensitive network TSN domain is abnormal; and a transceiver, configured to send first request information to the TSN domain, where the first request information indicates to replace a master clock in the TSN domain with a standby clock in the TSN domain.

In a possible design, the transceiver is configured to receive first capability information from a first terminal device and second capability information from a second terminal device, where the first capability information indicates that a first time sensitive network TSN node connected to the first terminal device has a synchronous timing capability, the first TSN node is the master clock, the second capability information indicates that a second TSN node connected to the second terminal device has a timing capability, and the second TSN node is the standby clock.

In a possible design, the processor is configured to: if the transceiver is configured to receive no synchronization packet from the first terminal device within a preset time period, determine that the timing link on the master clock side is abnormal.

In a possible design, the processor is configured to: when the transceiver is configured to receive second request information from the first terminal device or the second terminal device, where the second request information indicates to replace the master clock, determine, when the second request information is valid, that the timing link on the master clock side in the TSN domain is abnormal.

In a possible design, the transceiver is configured to send the first request information to the second terminal device in the TSN domain.

According to an eighth aspect, a terminal device is provided. The terminal device includes: a processor, configured to determine that a timing link on a master clock side in a time sensitive network TSN domain is abnormal; and a transceiver, configured to send first request information to a core network device, where the first request information indicates to replace a master clock in the TSN domain with a standby clock in the TSN domain.

In a possible design, the transceiver is configured to: before it is determined that the timing link on the master clock side in the time sensitive network TSN domain is abnormal, send first capability information to the core network device, where the first capability information indicates that a first TSN node connected to the terminal device has a synchronous timing capability, and the first TSN node is the master clock.

In a possible design, the processor is configured to: when no synchronization packet from the master clock is received within a preset time period, determine that the timing link on the master clock side is abnormal.

In a possible design, the transceiver is configured to send second capability information to the core network device, where the second capability information indicates that a second TSN node connected to the terminal device has a timing capability, and the second TSN node is the standby clock.

In a possible design, the processor is configured to: when the transceiver is configured to receive no synchronization packet from the master clock of an access network device within a preset time period, determine that the timing link on the master clock side is abnormal.

According to a ninth aspect, a communication apparatus is provided. The communication apparatus is configured to perform the method according to any one of the first aspect and the possible designs of the first aspect.

According to a tenth aspect, a communication chip is provided. The communication chip is configured to perform the method according to any one of the first aspect and the possible designs of the first aspect.

According to an eleventh aspect, a computer-readable storage medium is provided. The computer-readable storage medium includes computer instructions. When the computer instructions are run on an electronic device, the electronic device is enabled to perform the method according to any one of the first aspect and the possible designs of the first aspect.

According to a twelfth aspect, a computer program product is provided. When the computer program product runs on a computer, an electronic device is enabled to perform the method according to any one of the first aspect and the possible designs of the first aspect.

According to a thirteenth aspect, a communication apparatus is provided. The communication apparatus is configured to perform the method according to any one of the first aspect and the possible designs of the first aspect.

According to a fourteenth aspect, a communication chip is provided. The communication chip is configured to perform the method according to any one of the second aspect and the possible designs of the first aspect, and/or the method according to any one of the second aspect and the possible designs of the second aspect, and/or the method according to any one of the third aspect and the possible designs of the third aspect, and/or the method according to any one of the fourth aspect and the possible designs of the fourth aspect.

According to a fifteenth aspect, a computer-readable storage medium is provided. The computer-readable storage medium includes computer instructions. When the computer instructions are run on an electronic device, the electronic device is enabled to perform the method according to any one of the first aspect and the possible designs of the first aspect, and/or the method according to any one of the second aspect and the possible designs of the second aspect, and/or the method according to any one of the third aspect and the possible designs of the third aspect, and/or the method according to any one of the fourth aspect and the possible designs of the fourth aspect.

According to a sixteenth aspect, a computer program product is provided. When the computer program product runs on a computer, an electronic device is enabled to perform the method according to any one of the first aspect and the possible designs of the first aspect, and/or the method according to any one of the second aspect and the possible designs of the second aspect, and/or the method according to any one of the third aspect and the possible designs of the third aspect, and/or the method according to any one of the fourth aspect and the possible designs of the fourth aspect.

DETAILED DESCRIPTION OF EMBODIMENTS

For ease of understanding, some concepts related to embodiments of this application are described for reference by using examples. Details are shown as follows:

TSN domain: The TSN domain refers to a TSN network that has a same synchronization source clock (master clock). In a same TSN domain, there is only one synchronization source clock, and the synchronization source clock sends timing information to a TSN terminal (slave clock) in the TSN domain. A same TSN terminal may receive data from a plurality of TSN domains. The TSN terminal identifies a domain to which a TSN data packet belongs by reading a TSN domain ID (domain identity) in the TSN data packet.

TSN Time Synchronization Precision:

The TSN time synchronization precision refers to a time offset (time difference) between two synchronized clocks at both ends of a TSN domain. To achieve synchronization between the two clocks, a master clock at one end of the TSN domain needs to send a synchronization packet to a slave clock at the other end of the TSN domain, where the synchronization packet includes information about a moment of the master clock at which the master clock sends the packet. A 5GS may serve as a bridge (transparent clock), to transfer the synchronization packet to the slave clock and notify the slave clock of a delay of the packet in the 5GS. By reading the information about the moment in the packet and information about the delay of transferring the packet on a link, a secondary clock can calculate information about a moment currently corresponding to the master clock and synchronize with the master clock. A precision error of the information about the delay reported by the 5GS affects the TSN time synchronization precision.

The following separately describes time synchronization in a TSN and how a 5GS supports the TSN.

Time Synchronization in the TSN:

In the TSN, to support time-based control, TSN devices need to maintain precise synchronization. Currently, a precision time protocol (PTP) (or an institute of electrical and electronics engineers (IEEE) 1588 protocol) is usually used in the TSN to implement precise time synchronization between the TSN devices. In the PTP, usually, timing signaling used for synchronization between PTP devices is also referred to as a PTP message/PTP packet. Therefore, data transmitted in the TSN may be classified into two types: a PTP message used for timing and a service-related data packet (TSN data).

Figure 1:
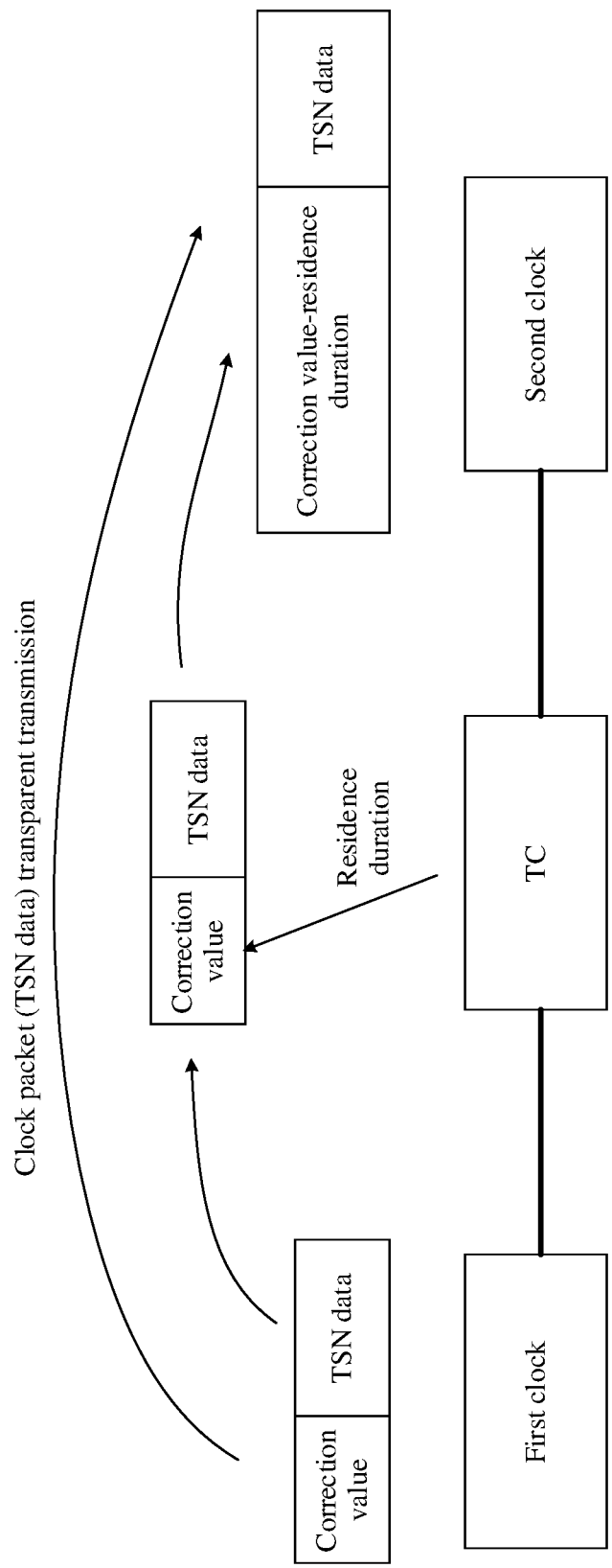
FIG. 1 is a schematic working diagram of a TC according to an embodiment of this application.

For time synchronization, the PTP defines a basic clock node type: a transparent clock TC. The TC does not need to maintain time synchronization with another device. The TC has a plurality of clock ports. A PTP message/PTP packet (carrying a correctionField field) is forwarded between these ports, to correct a forwarding delay of the PTP message/PTP packet, but not perform time synchronization from any port. As shown in FIG. 1, a first clock may forward a clock packet (PTP message/PTP packet) to a second clock through a TC, or may forward TSN data to the second clock through the TC. When the clock packet passes through the TC, a certain processing delay is caused when the TC forwards the clock packet. When forwarding the clock packet, the TC may add residence duration of the message/packet on this node to a correction value (correctionField) field of the clock packet. After receiving the clock packet, a TSN slave node synchronizes its own clock based on time information in the packet and a correction value included in the correctionField field.

A structure of a header of the PTP message may be shown in Table 1:

TABLE 1

| | |
|---|---|
| transportSpecific (specific transmission header) | Message type (massageType) |
| Reserved (reserved) | versionPTP (PTP version) |
| Message length (messageLength) | |
| Domain number (domainNumber) | |
| Reserved (reserved) | |
| Flags (flags) | |
| Correction value (correctionField) | |
| Reserved (reserved) | |
| Source port identifier (sourcePortIdentity) | |
| Sequence number (sequenceId) | |
| Control (control) | |
| Log information interval (logMessageInterval) | |

Figure 2:
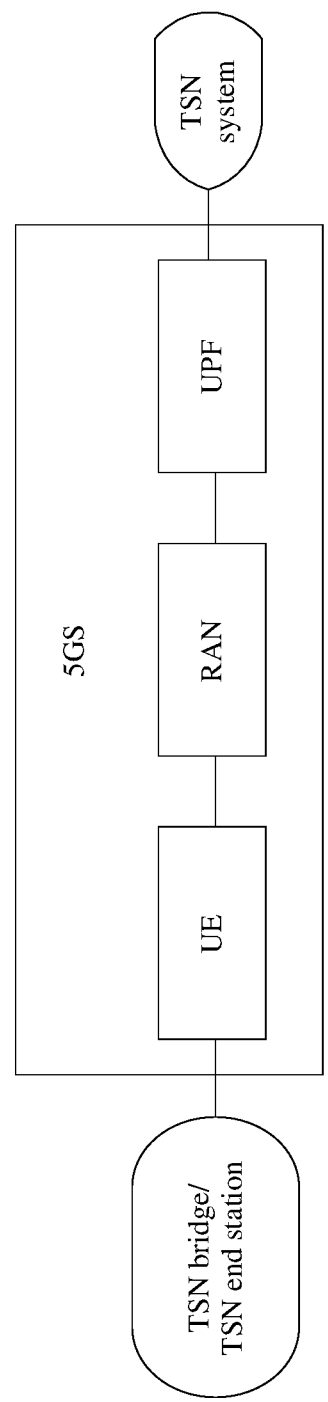
FIG. 2 is a schematic diagram of using a 5GS as a TSN bridge according to an embodiment of this application.
Figure 3:
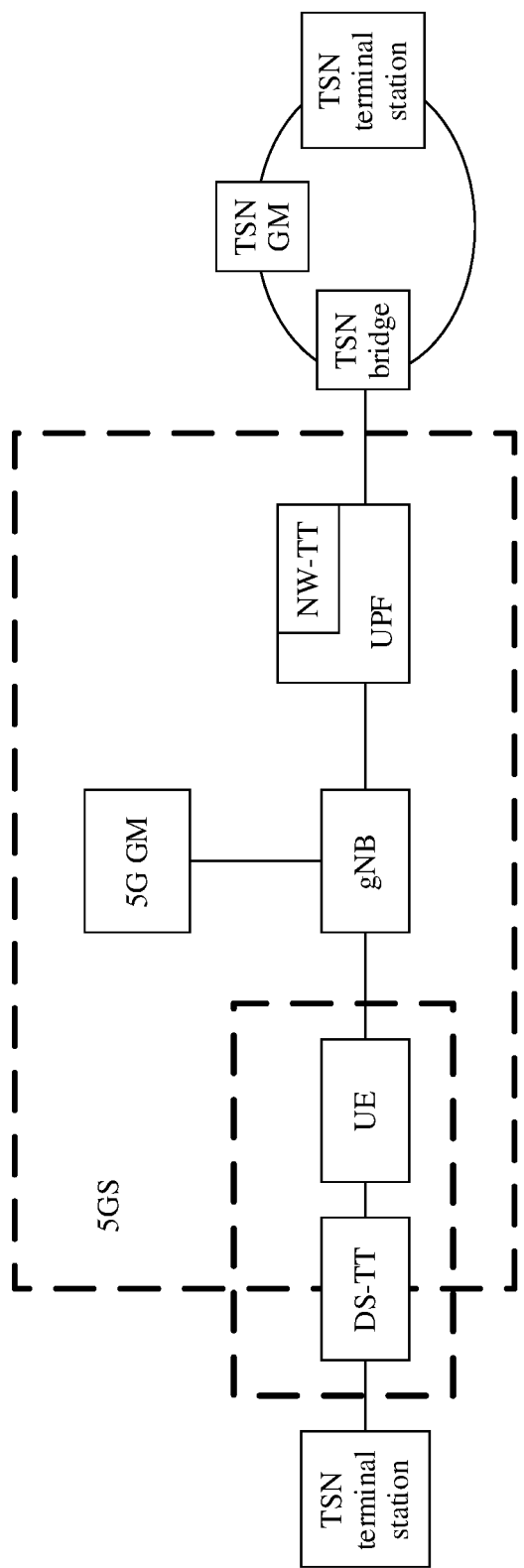
FIG. 3 is a schematic diagram of using a 5GS in a TSN downlink timing scenario according to an embodiment of this application.

The 5GS supports the TSN:

FIG. 2 is a schematic diagram of using a 5GS as a TSN bridge. A TSN service data packet may be sent in uplink/downlink through the 5GS. FIG. 2 shows only a user plane part of the 5GS, including user equipment (UE), a radio access network (RAN), and a user plane function (UPF) network element. A TSN bridge or a TSN end station may perform user plane communication with a UE side, and a clock is configured in the end station. A device in a TSN system may communicate with a UPF side. In another aspect, to support the PTP protocol, the TSN needs the 5GS to adapt to the PTP protocol. A solution used by the 3rd generation partnership project (3GPP) is to use the 5GS as a transparent clock. FIG. 3 shows a downlink timing scenario. A PTP message sent by a TSN master clock (grandmaster clock, GM) (where for example, the TSN master clock may be located in a TSN server connected to a UPF) may be forwarded to a TSN end station through a 5GS. A TSN adapter is required at a boundary location between the 5GS and the TSN, to process a message or a TSN service data packet related to the PTP protocol. For example, in FIG. 3, a user-side TSN adapter (UE TSN translator, UE-TT) (or referred to as a device-side TSN adapter (device-side TSN Translator, DS-TT)) on a UE side and a network-side TSN adapter (network-side TSN translator, NW-TT) on a UPF side are corresponding adapters. The DS-TT/NW-TT may be a processing device connected to UE/the UPF, or may be a logical function of the UE/UPF.

When forwarding a PTP message, the transparent clock needs to correct residence duration of the message on this node to a correctionField field. To obtain residence duration of the PTP message/PTP packet in the 5GS, the 5GS needs to ensure 5G clock synchronization between the UPF and the UE. To ensure the 5G clock synchronization between the UE and the UPF, clock synchronization needs to be implemented between the UE and a base station (gNodeB, gNB), and clock synchronization needs to be implemented between the UPF and the gNB by using the PTP protocol. The clock synchronization between the UE and the UPF is ensured by obtaining time from a same clock source by the UE and the UPF (where as shown in FIG. 3, clock synchronization is performed between the gNB and the 5G GM; further, the clock synchronization is implemented between the UE and the gNB by using an air interface synchronization solution, and the clock synchronization is implemented between the UPF and the gNB by using the PTP protocol).

After time synchronization is implemented for all network elements in the 5GS, the NW-TT adds a 5G timestamp tin to a PTP message/PTP packet when the PTP message/PTP packet enters from the UPF side. If 5G time at which the DS-TT on the UE side sends the PTP message/PTP packet is tout, the DS-TT adds (tout-tin) to a correctionField field of the PTP message.

Figure 4:
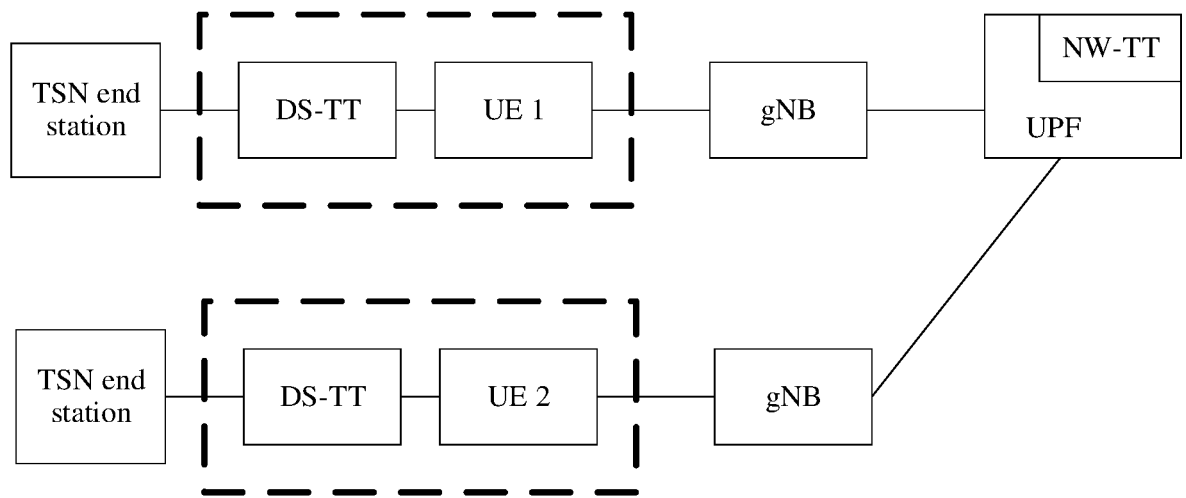
FIG. 4 is a schematic diagram of using a 5GS in a TSN uplink timing scenario according to an embodiment of this application.

The 5GS Supports an Uplink Timing Procedure:

A TSN timing scenario may be a scenario in which a master clock is located outside a UPF, and performs timing for a TSN slave node connected to a UE side (which may be referred to as a downlink timing scenario), or may be a scenario in which a master clock is located on a TSN master node connected to a UE side, and performs timing for a TSN slave node located outside a UPF or a TSN slave node connected to another UE (which may be referred to as an uplink timing scenario). For example, an uplink timing scenario is shown in FIG. 4. A TSN timing packet enters a 5GS from UE 1, passes through a gNB, a UPF, and another gNB, and is finally transferred to another TSN end station through UE 2. Similar to the downlink scenario in FIG. 3, in the uplink scenario, timestamps also need to be added to the TSN timing packet at an ingress and an egress of the 5GS. A difference lies in that the ingress and the egress in the uplink scenario are the UE 1 and the UE 2, and an ingress and an egress in the downlink scenario are the UPF and the UE.

Figure 5:
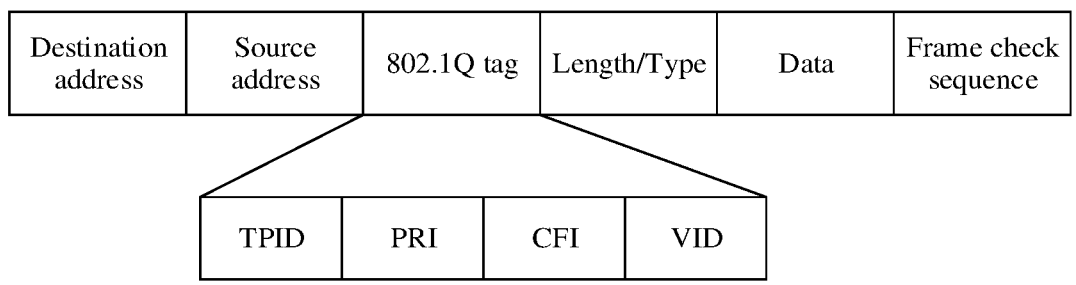
FIG. 5 is a schematic diagram of a structure of a VLAN data frame according to an embodiment of this application.

VLAN Standard Overview:

Transferring of some data packets in a TSN needs to comply with a virtual local area network (VLAN) standard. VLAN is a communication technology that logically divides a physical local area network (LAN) into a plurality of broadcast domains. FIG. 5 is a schematic diagram of a structure of a VLAN data frame. The data frame may include the following fields: a destination address, a source address, an 802.1Q tag, a length/type, data, and a frame check sequence (FCS), where 802.1Q tag is a formal standard of VLAN, and the 802.1Q tag may include a tag protocol identifier (TPID), a priority (priority, PRI), a canonical format indicator (CFI), and a VID (VLAN ID). The VID field is used to identify a VLAN (namely, a TSN domain ID) to which the data frame belongs, in other words, the data frame can be transmitted only in the VLAN to which the data frame belongs. The VLAN ID field includes a total of 12 bits. A value indicated by the 12 bits ranges from 0 to 4095, which indicate 4096 different values. 0 and 4095 are invalid values. Therefore, a common configuration range of the VLAN ID is from 1 to 4094.

Figure 6:
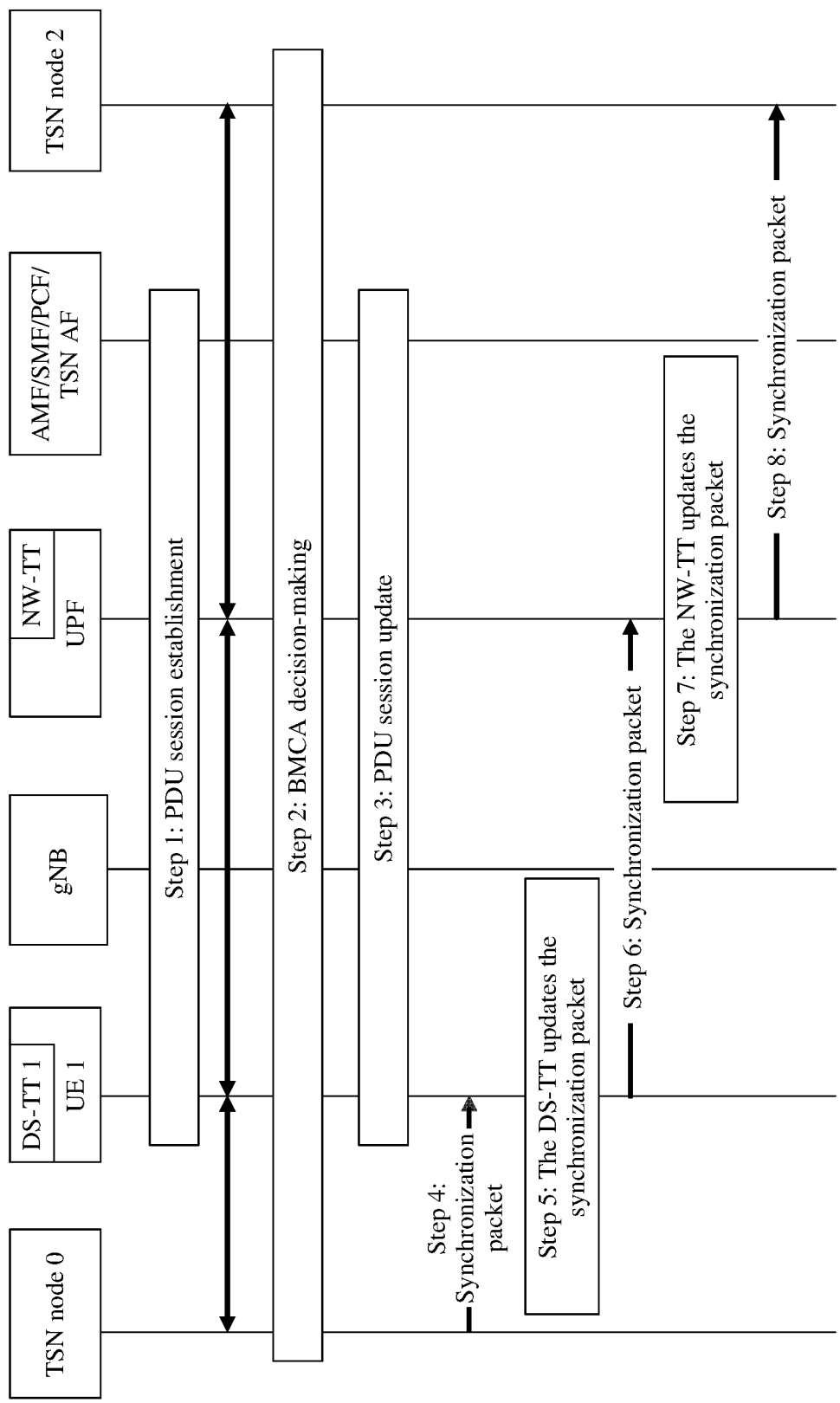
FIG. 6 is a schematic flowchart of TSN uplink synchronization in which a 5GS is used as a TC according to an embodiment of this application.

TSN Uplink Time Synchronization Procedure:

A typical TSN uplink synchronization procedure in which a 5GS is used as a TC is shown in FIG. 6. The procedure describes a scenario in which UE performs timing for a clock on a UPF side, where a TSN node (Node) 0 is a clock (master clock) on a UE side, and a TSN node 2 is a clock (slave clock) on the UPF side.

Step 1: UE 1 establishes a protocol data unit session (PDU session) with the 5GS. This step includes: The UE 1 transfers a media access control (MAC) address or port information of the UE 1 to a UPF, an authentication management function (AMF) network element/a session management function (SMF) network element/a policy control function (PCF) network element, and the like, or transfer the MAC address or the port information to an application server (AS), a TSN application function (AF) network element, and the like. This step is equivalent to establishing a channel between the UE 1, a gNB, and core network elements such as the UPF, so that these network elements exchange signaling or data in subsequent steps.

Step 2: Determine an optimal clock in a TSN domain, for example, determine the optimal clock by using a best master clock algorithm (BMCA).

Step 3: Interfaces (a DS-TT 1 and an NW-TT) on both sides of the 5GS initiate PDU session update.

Step 4: The TSN node 0 sends a synchronization packet (including a TSN master clock timestamp, a correction field, and a rateRatio field, where rateRatio=GM clock frequency/local clock frequency) in a TSN format to the UE 1 in the 5GS.

Step 5: The UE 1 may convert, through the DS-TT 1, the received synchronization packet in the TSN format into a packet in a format that can be transferred in the 5GS. Specifically, a delay between the TSN node 0 and the DS-TT 1 is added to the correction field, the rateRatio is updated, and an ingress 5GS timestamp is added. The ingress 5GS timestamp may be understood as time at which the UE 1 receives the synchronization packet in the TSN format.

Step 6: The UE 1 sends the synchronization packet obtained after conversion in step 5 to the UPF. The synchronization packet sent to the UPF includes the TSN master clock timestamp, a correction field, a rateRatio field, and the ingress 5GS timestamp.

Step 7: The UPF may convert, through the NW-TT, the received synchronization packet in a 5GS format in step 6 into a synchronization packet in the TSN format that is sent to the TSN domain. Specifically, the correction field is updated to original value of the correction field in step 6+(egress 5GS time−ingress 5G timestamp)*rateRatio, and the ingress 5GS timestamp is discarded. The egress 5GS time may be understood as time at which the UPF sends the synchronization packet in the TSN format.

Step 8: The NW-TT sends the synchronization packet in the TSN format obtained after conversion in step 7 to the TSN node 2, so that the TSN node 2 performs time synchronization.

Figure 7:
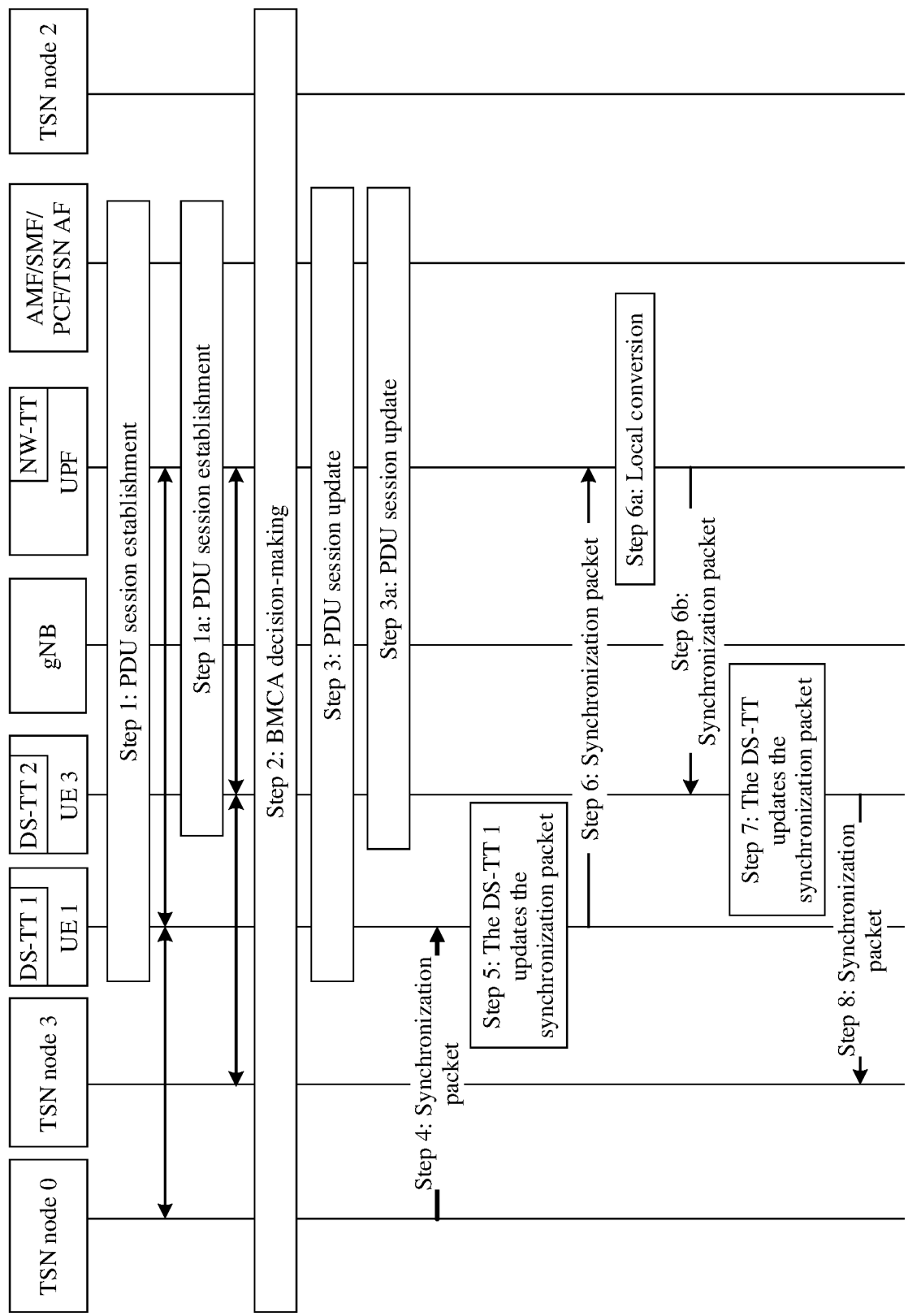
FIG. 7 is a schematic flowchart of TSN uplink synchronization in which a 5GS is used as a TC according to an embodiment of this application.

Another typical TSN uplink synchronization procedure in which a 5GS is used as a TC is shown in FIG. 7. The procedure describes a scenario in which UE performs timing for a clock on another UE side, where a TSN node 0 is a master clock connected to a UE 1 side, a TSN node 2 is a standby clock on the another UE side, and a TSN node 3 is a slave clock connected to a UE 3 side.

Step 1 to step 6 are similar to those in the TSN uplink synchronization procedure shown in FIG. 6.

Step 6a/6b: Different from the first typical TSN uplink synchronization procedure, in the procedure in FIG. 7, after receiving the synchronization packet in the TSN format, the UPF does not send the synchronization packet in the TSN format to the NW-TT, but directly performs local conversion to identify an address to which the synchronization packet in the TSN format needs to be forwarded. Then, the UPF returns the synchronization packet in the TSN format to the gNB based on the address, and indicates the gNB to send the synchronization packet in the TSN format to UE 2 corresponding to the address to which the packet needs to be forwarded.

Step 7 and step 8 are similar to step 7 and step 8 in the TSN uplink synchronization procedure shown in FIG. 6, and a difference lies in that an execution body is changed from the NW-TT to a DS-TT 2, and a receiver of the synchronization packet in the TSN format is changed to the UE 2.

Requirement on a Synchronization Periodicity of a PTP Timing Message:

Because a master clock and each slave clock in a TSN clock domain drift, uplink timing needs to be periodically performed. Usually, a minimum periodicity is 32 ms.

Figure 8:
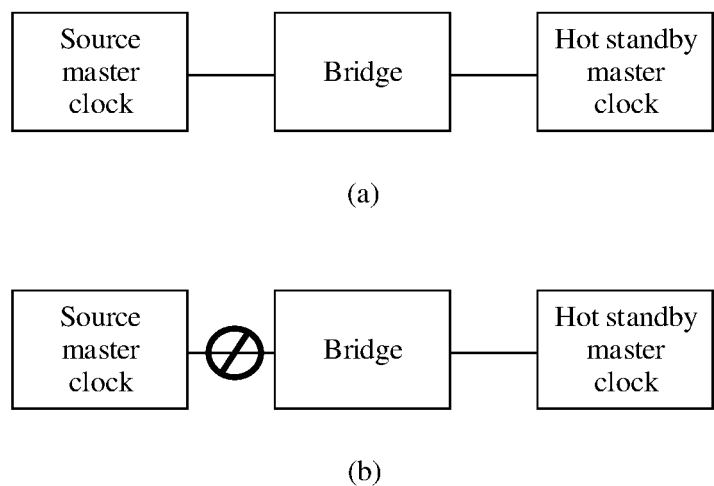
FIG. 8 is a schematic diagram of a network topology in which a master clock and a standby clock are located according to an embodiment of this application.
Figure 9:
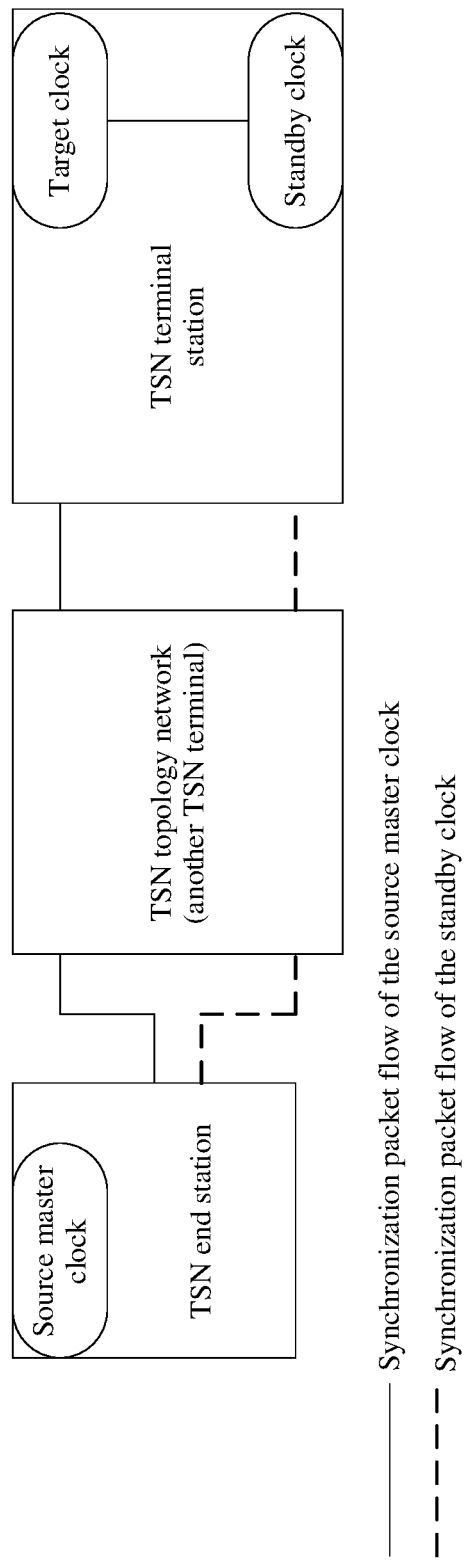
FIG. 9 is a schematic diagram of a working principle of a standby clock according to an embodiment of this application.

Currently, a standby clock mechanism (for example, a redundant hot standby master clock) is mentioned in the IEEE P802.1AS standard and the mainstream industrial Ethernet standard Profinet. (a) in FIG. 8 is a schematic diagram of a network topology in which a master clock and a standby clock (standby master clock) are located, and (b) in FIG. 8 is a schematic diagram in which a link of a master clock is abnormal. FIG. 8 may also be understood as a schematic diagram of a working principle of a standby clock shown in FIG. 9. To be specific, when a source master clock (clock source) works normally, a TSN end station in which the source master clock is located sends a synchronization packet flow to an entire TSN topology network (another TSN terminal), and a "target clock" (clock target) corresponding to a standby clock receives periodic source master clock signals as sleep instructions. Once the source master clock fails (because the source master clock is faulty or a link on a source master clock side is faulty, or due to another reason) and the "target clock" does not receive continuous timing packets, the standby clock is triggered to be enabled. The standby clock starts to take over a role of the source master clock and sends a synchronization packet flow to the entire TSN topology network.

As described above, when the standby clock is enabled is determined by a TSN end station of the standby clock, but the TSN end station of the standby clock cannot determine whether an uplink air interface link on a master clock side or a downlink air interface link on a standby clock side is faulty. Once the air interface link of the master clock is normal but the downlink air interface link of the standby clock is abnormal (for example, the link is intermittent), the standby clock mistakenly considers that a fault occurs on the master clock side, and mistakenly enables the standby clock and uploads a synchronization packet to a UPF. As a result, synchronization precision of a slave clock is affected, and air interface overheads of a 5GS are also increased. In addition, a current manner of recommending a master clock and a standby clock via a TSN topology has slow convergence and complex algorithms. Therefore, the manner is applicable to a stable topology network established through wired connections. When a 5GS is introduced as a bridge to transfer timing signals for a topology network, because a 5G air interface is more unstable than a wired connection (a link disconnection problem), a plurality of BMCA procedures are easily triggered. Therefore, the BMCA procedure with slow convergence may cause undesired consequences such as a delay of a clock synchronization packet and synchronization precision deterioration.

Therefore, embodiments of this application provide a timing method for dealing with a link exception, and the method may be applied to a process of enabling a standby clock to replace a master clock in a TSN.

In this application, to resolve the foregoing problems, when a link on a master clock side is referred to as a TSN timing link, in an implementation, if the standby clock in a same TSN domain does not receive a sleep instruction from the master clock and then is automatically enabled, and a core network device, for example, a UPF, in a 5GS receives both a synchronization packet of the master clock and a synchronization packet of the standby clock, the UPF may determine a to-be-forwarded synchronization packet and a to-be-filtered synchronization packet in the two synchronization packets, to avoid a "dual-clock" phenomenon. This can avoid delivering both the two packets to a TSN server or an air interface, reduce signaling exchange and air interface overheads, and improve synchronization precision of a slave clock. In addition, in a current technology, recommending a master clock and a standby clock by using a BMCA algorithm is performed before a synchronization packet flow starts to be sent, and a recommendation manner has slow convergence. However, in this application, a function of the UPF may be enhanced, so that in a process of sending a synchronization packet flow, the to-be-forwarded synchronization packet and the to-be-filtered synchronization packet can be determined in the synchronization packets of the two clocks received in the same TSN domain, and a clock corresponding to the to-be-forwarded synchronization packet is determined as the master clock, and a clock corresponding to to-be-filtered synchronization packet is determined as the standby clock. Therefore, compared with the manner of determining the master clock and the standby clock by using the BMCA algorithm with slow convergence, in a process of forwarding the synchronization packet flow, the enhanced UPF can directly determine the master clock and the standby clock based on the received synchronization packets of the two clocks. In this way, in this application, convergence time of recommending the master clock and the standby clock can be shortened by using the enhanced UPF, and synchronization efficiency can be improved.

In another implementation, a network element (for example, a terminal device on the master clock side, a terminal device on a standby clock side, a base station, or a core network device) in a 5GS may determine whether the link on the master clock side is abnormal. If determining that the link is abnormal, the network element in the 5GS may indicate to enable the standby clock. In an aspect, a link disconnection problem of a 5G air interface can be resolved. To be specific, the network element in 5G can be used to sense a 5G air interface problem more quickly and efficiently, a risk of timing interruption in the TSN can be reduced, and an occasion for enabling the standby clock can be determined in a timely manner. In addition, the 5GS can properly allocate uplink resources, and it is ensured that duration for enabling the standby clock is less than a synchronization periodicity. In another aspect, compared with a manner of recommending a master clock and a standby clock by using a BMCA algorithm with slow convergence before a synchronization packet flow starts to be sent, in this application, in a process of sending a synchronization packet flow, the network element in the 5GS may determine whether the link on the master clock side is abnormal. When determining that the link on the master clock side is abnormal, the network element in the 5GS determines in a timely manner that the master clock needs to be replaced, to enable the standby clock. Therefore, in this application, in a manner of recommending the standby clock by the network element in the 5GS, convergence time of recommending the standby clock can be shortened, and synchronization efficiency can be improved.

Figure 10:
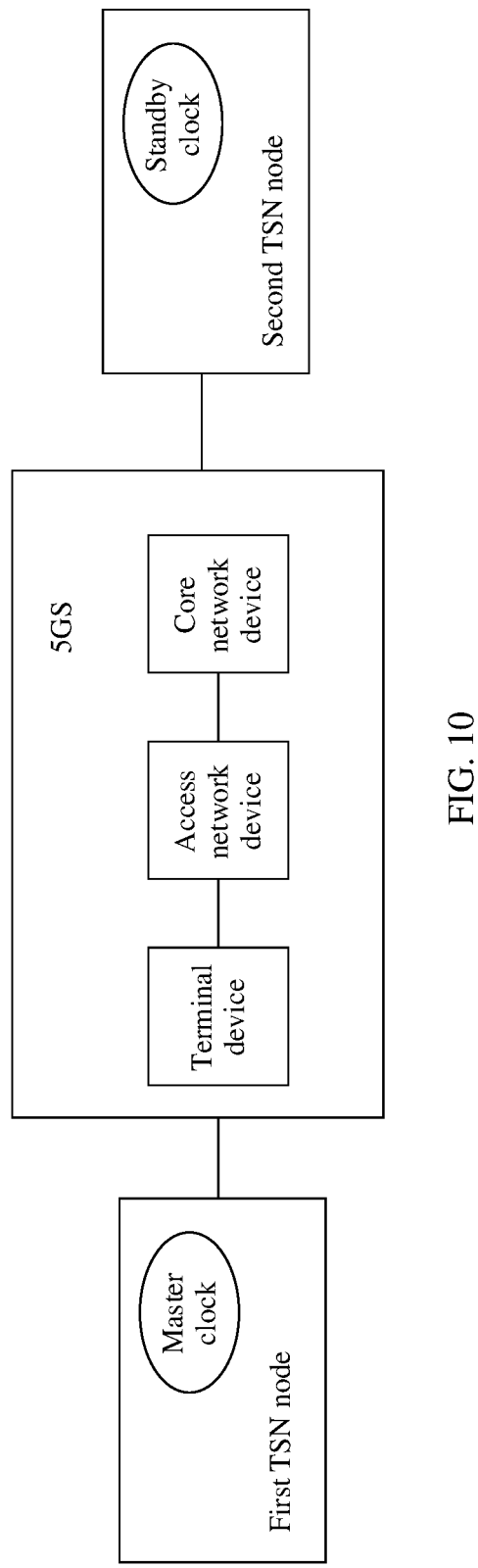
FIG. 10 is a schematic diagram of a network architecture according to an embodiment of this application.

As shown in FIG. 10, a network architecture in this application may include a first TSN node on which a master clock is located, a second TSN node on which a standby clock is located, and a 5GS. The 5GS may include a terminal device, an access network device, a core network device, and the like. The access network device may be a next generation-radio access network (NG-RAN) device, for example, a gNB. The core network device may include a UPF, an AMF, an SMF, and the like.

Figure 11:
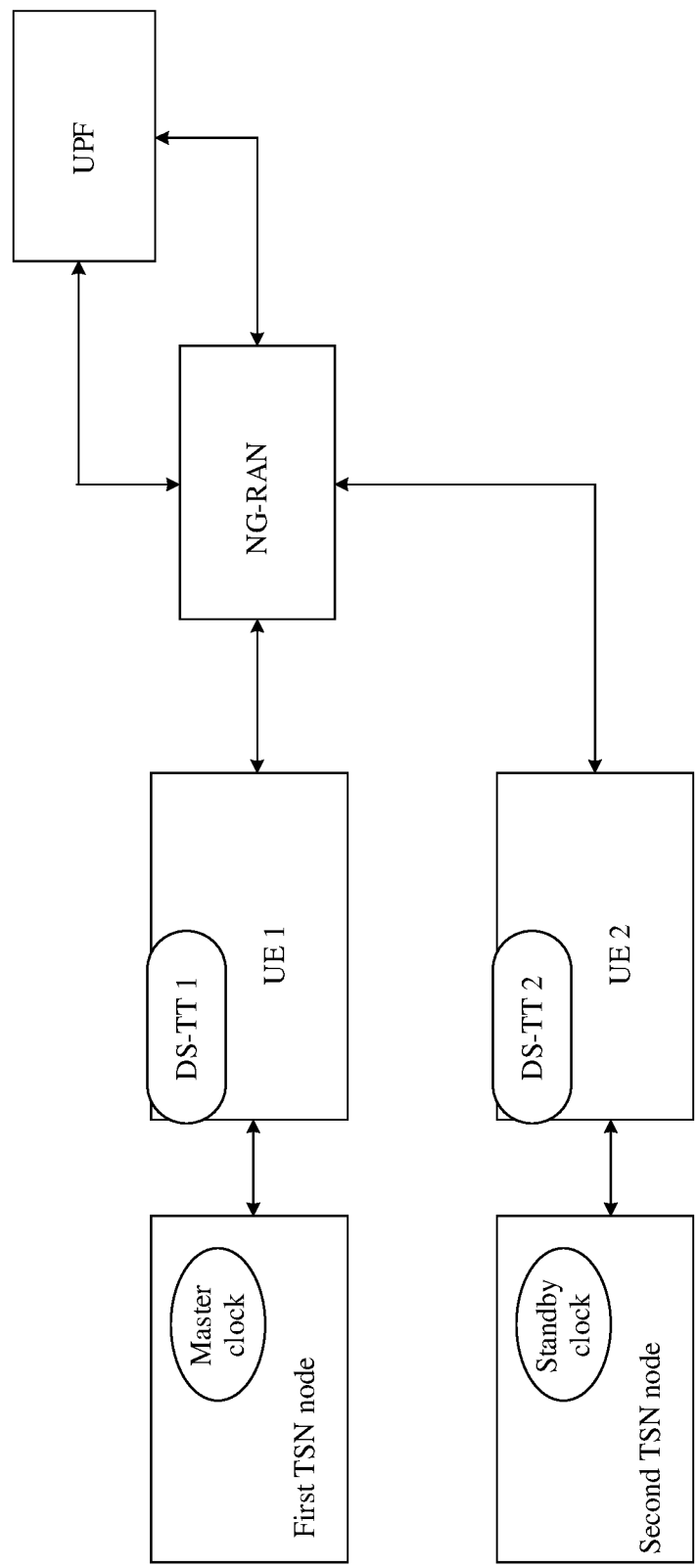
FIG. 11 is a schematic diagram of a combination of nodes in which a master clock and a standby clock are located according to an embodiment of this application.

There may be a plurality of different combinations for nodes on which the master clock and the standby clock are located. Examples are shown as follows:

As shown in FIG. 11, the first TSN node on which the master clock is located may communicate with a first terminal device (for example, UE 1) in the 5GS, and the second TSN node on which the standby clock is located may communicate with a second terminal device (for example, UE 2) in the 5GS. In this case, the UE 1 may include a DS-TT 1, the UE 2 may include a DS-TT 2, and both the UE 1 and the UE 2 may communicate with the NG-RAN and a core network device (for example, the UPF) in the 5GS.

Figure 12:
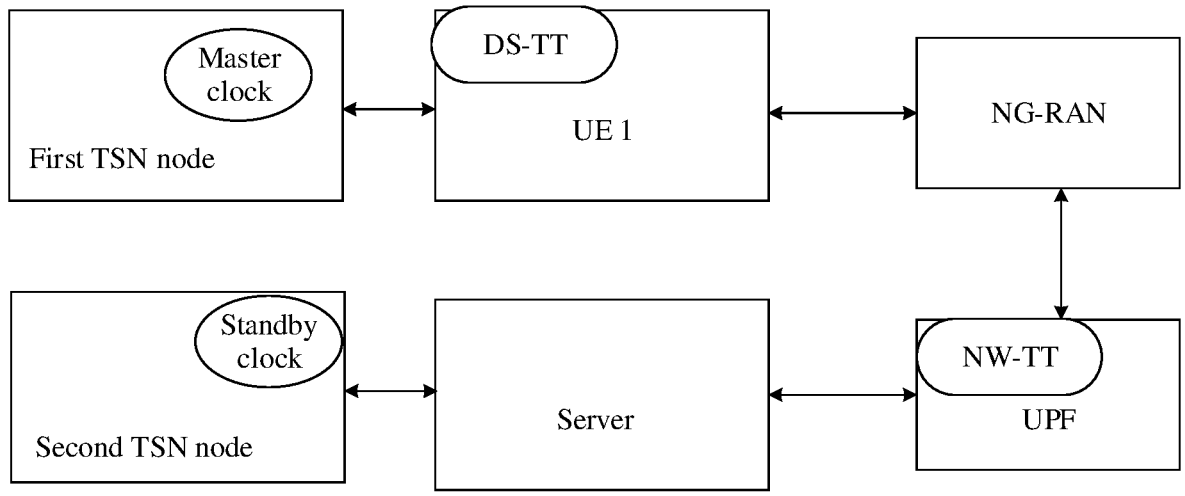
FIG. 12 is a schematic diagram of a combination of nodes in which a master clock and a standby clock are located according to an embodiment of this application.

As shown in FIG. 12, the first TSN node on which the master clock is located may communicate with UE 1 in the 5GS, the second TSN node on which the standby clock is located may communicate with a server in a TSN system, and the server may further communicate with the UPF. In this case, the UE 1 may include a DS-TT, and the UPF may include an NW-TT.

Figure 13:
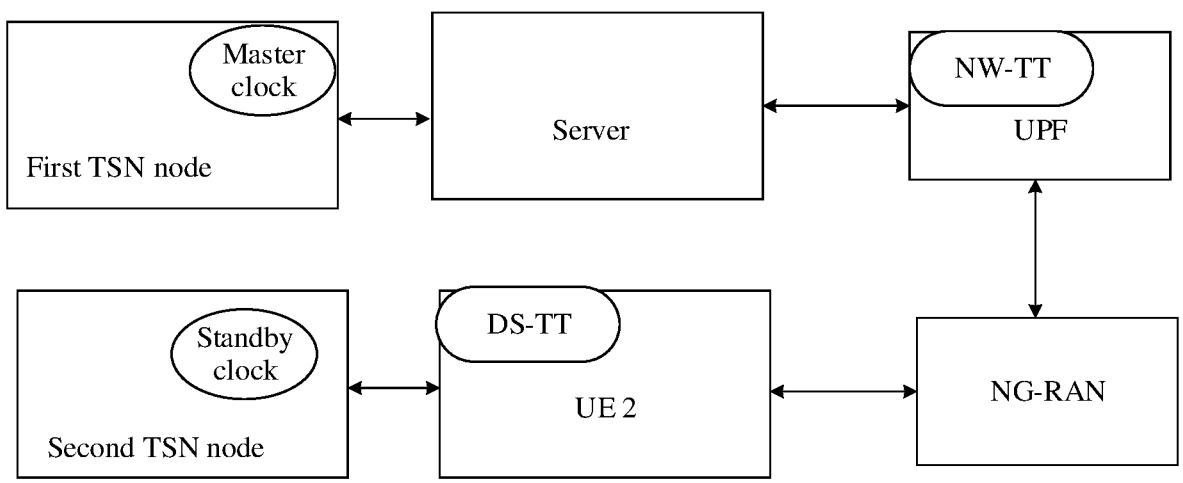
FIG. 13 is a schematic diagram of a combination of nodes in which a master clock and a standby clock are located according to an embodiment of this application.

As shown in FIG. 13, the first TSN node on which the master clock is located may communicate with a server in a TSN, and the server may communicate with the UPF. The second TSN node on which the standby clock is located may communicate with UE 2. The UE 2 includes a DS-TT, and the UPF may include an NW-TT.

It should be noted that the UE 1 and the UE 2 may be terminal devices served by a same gNB, or may be terminal devices served by different gNBs.

The terminal device in embodiments of this application may be UE, a mobile station (MS), a mobile terminal (MT) or the like, and is a device that provides a user with voice and/or data connectivity.

The access network device is a radio access network (RAN) node (or device) that connects a terminal to a wireless network, and may also be referred to as a base station.

The UPF network element is a functional network element on a user plane, and is mainly responsible for a connection to an external network. The UPF network element includes related functions of a serving gateway (SGW) and a public data network gateway (PDN-GW) in long term evolution (LTE), and is mainly responsible for packet data packet forwarding, charging information statistics collection, and the like.

The AMF network element is responsible for access management and mobility management of a terminal. During actual application, the AMF network element includes a mobility management function of a mobility management entity (MME) in LTE, and further includes an access management function.

The SMF network element is responsible for session management, for example, session establishment, modification, and release of a terminal device (UE).

The NW-TT/DS-TT is a TSN adapter connected to a UPF/UE, and is configured to process messages or TSN service data packets related to the PTP protocol.

Figure 14:
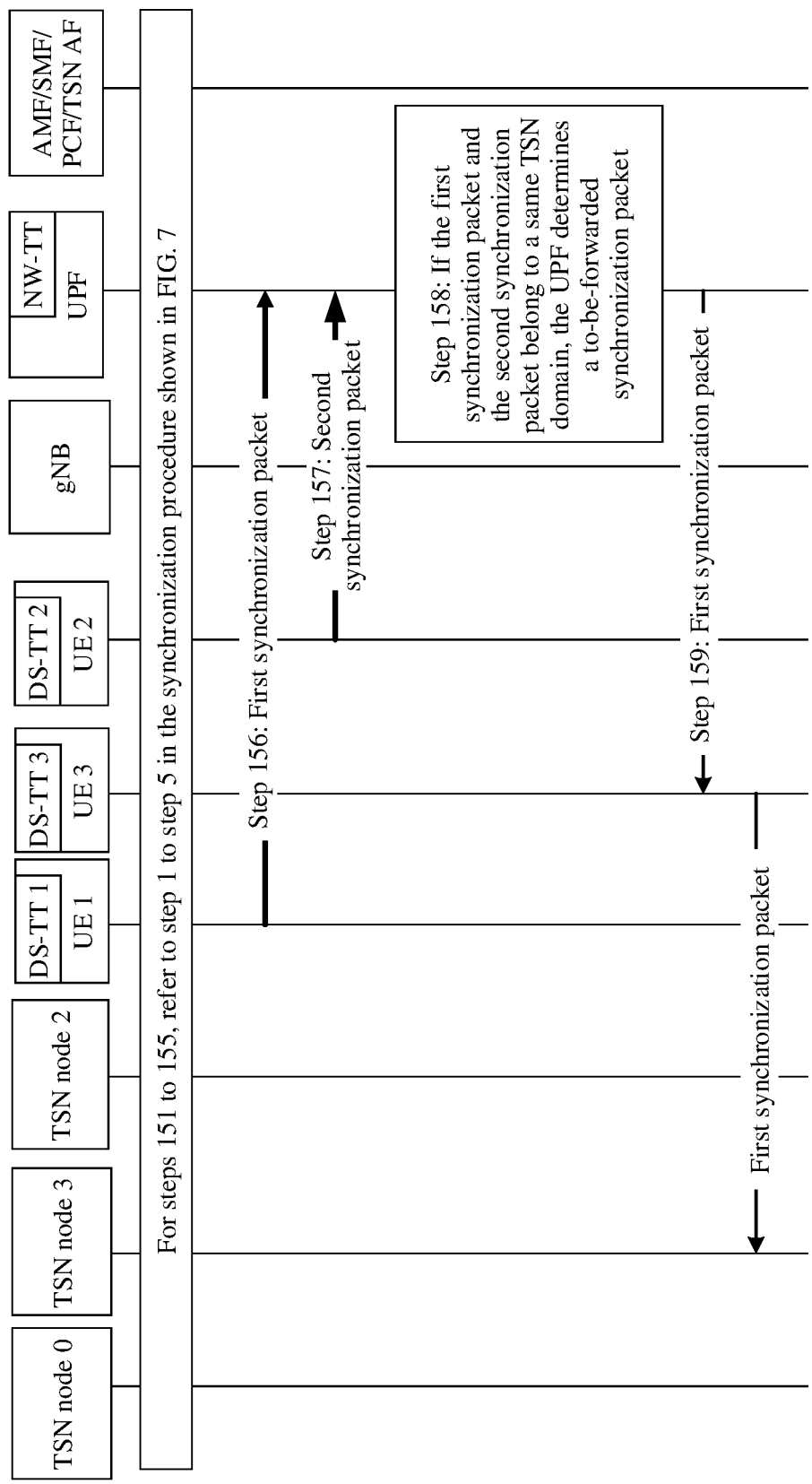
FIG. 14 is a schematic flowchart of a timing method for dealing with a link exception according to an embodiment of this application.

Through application of the foregoing network architecture, an embodiment of this application provides a timing method for dealing with a link exception. The method may be applied to the network architecture shown in FIG. 11, and the method may be applied to a core network device or a chip in the core network device. That the core network device is a UPF, and a master clock on a UE side performs timing for a slave clock on another UE side is used as an example. As shown in FIG. 14, the method may include the following steps.

Steps 151 to 155 are similar to step 1 to step 5 in the synchronization procedure shown in FIG. 7.

This embodiment of this application is mainly for an operation procedure of the core network device (the UPF) for a plurality of TSN synchronization packets. For different deployment combinations of the master clock and a standby clock, the core network device performs same behavior (because regardless of whether the master clock or the standby clock is located on UE or a TSN server outside the UPF, a timing packet of the master clock and the 2nd timing packet that is generated due to mistaken triggering of the standby clock arrive at the UPF, and therefore, for the UPF, specific operation behavior is to filter out the mistakenly triggered timing packet and forward the timing packet of the master clock). Therefore, for steps performed before the UPF receives a synchronization packet, refer to step 1 to step 5.

Step 156: The UPF receives a first synchronization packet from a first terminal device.

The first terminal device may be the UE 1 or the UE 2 in FIG. 11. It should be noted that FIG. 14 shows a scenario of a link of a master clock (in a node 0) on a UE 1 side, a link of a slave clock (in a node 3) on a UE 3 side, and a link of another master clock (in a node 2) on a UE 2 side. FIG. 14 shows an example of a first synchronization packet sent by the master clock on the UE 1 side. In other words, in FIG. 14, the first terminal device in step 156 is the UE 1.

The first synchronization packet may carry time information of the master clock in a TSN domain, or may carry time information of the standby clock in the TSN domain.

In a current technology, when receiving the first synchronization packet from the first terminal device, the UPF does not perform operations such as opening and reading on the first synchronization packet. However, in this application, the UPF needs to read a TSN domain ID carried in the first synchronization packet. If the first synchronization packet is a synchronization packet of a TSN domain in which timing synchronization is being performed, the UPF continues to perform subsequent processing. If the first synchronization packet is not a synchronization packet of a TSN domain in which timing synchronization is being performed, the UPF ignores the first synchronization packet. In this way, the UPF can be prevented from mistakenly filtering out a synchronization packet of another TSN domain, and therefore affecting a normal synchronization process of the another TSN domain.

Herein, the TSN domain ID may be read by the UPF. Alternatively, the TSN domain ID may be read by an NW-TT connected to the UPF, and then the NW-TT reports the TSN domain ID to the UPF.

In some embodiments, the UPF may read the TSN domain ID in a plurality of manners. Examples are shown as follows:

(1) The UPF reads a VID in the first synchronization packet (refer to the descriptions of FIG. 5).

(2) The UPF reads a TSN domain number (domainNumber) carried in a packet header of the first synchronization packet (refer to the descriptions in Table 1).

(3) The UPF reads an address of the first terminal device carried in the first synchronization packet. If each terminal device or server is bound to one TSN domain, the UPF may determine, based on an address of the terminal device or a server, the TSN domain to which the first synchronization packet belongs. The address may be a MAC address or an internet protocol (IP) address.

In other words, the UPF may determine, based on the VID, the domainNumber, or the address of the first terminal device carried in the first synchronization packet, the TSN domain to which the first synchronization packet belongs.

In some embodiments, when receiving a TSN packet, the UPF needs to first read a source address and a destination address (refer to the descriptions of FIG. 5) that are carried in the TSN packet, to determine, based on a quantity of source addresses and a quantity of destination addresses, whether the received TSN packet is a timing synchronization packet. This is because the TSN packet may alternatively be a TSN service packet. Usually, a packet with one source address and a plurality of destination addresses is a timing synchronization packet, and a TSN packet with one source address and one destination address is a service packet. For example, the service packet is control signaling sent by a TSN server to a TSN mechanical arm terminal. In other words, when receiving the first synchronization packet or a second synchronization packet, the UPF needs to first determine whether the first synchronization packet or the second synchronization packet is a timing synchronization packet.

Step 157: The UPF receives the second synchronization packet from a second terminal device.

If the first terminal device is the UE 1, the second terminal device may be the UE 2 (as illustrated in FIG. 14). Alternatively, the first terminal device is the UE 2, and the second terminal device is the UE 1.

Similar to step 156, when receiving the second synchronization packet, the UPF also needs to perform operations such as opening and reading on the second synchronization packet, to read a TSN domain ID in the second synchronization packet. For a reading manner, refer to the descriptions of step 156.

Step 158: If the first synchronization packet and the second synchronization packet belong to the same TSN domain, the UPF determines a to-be-forwarded synchronization packet in the first synchronization packet and the second synchronization packet.

In other words, when the UPF receives a plurality of synchronization packets in a same TSN domain, the UPF needs to filter out a synchronization packet generated by a mistaken triggering operation, to ensure that each TSN node in the TSN domain receives a clock signal of only one synchronization source clock.

In some embodiments, an implementation in which the first synchronization packet and the second synchronization packet belong to the same TSN domain may include one of the following manners:

(1) The VID carried in the first synchronization packet is the same as a VID carried in the second synchronization packet.

(2) The TSN domain domainNumber carried in the packet header of the first synchronization packet is the same as a TSN domain domainNumber carried in the second synchronization packet.

(3) The address of the first terminal device carried in the first synchronization packet and an address of the second terminal device carried in the second synchronization packet both belong to the same TSN domain. The address may be a MAC address, an IP address, or the like.

For example, a mapping relationship (or binding information) between an address of UE and a TSN domain may be notified by the UE to a network device (for example, the UPF) through UE capability reporting when the UE establishes a connection to the network device. Similarly, if a synchronization packet is sent by a server, a mapping relationship (or binding information) between an address of the server and a TSN domain may be notified by the server to the network device through server capability reporting when the server establishes a connection to the network device.

In some embodiments, before determining the to-be-forwarded synchronization packet in the first synchronization packet and the second synchronization packet, the UPF may send the first synchronization packet and the second synchronization packet to an AMF network element, so that the AMF network element may perform authentication on the first synchronization packet and the second synchronization packet, to determine whether the first synchronization packet and the second synchronization packet are valid. This is because the synchronization packet received by the UPF may be a malicious attack packet.

If the AMF network element determines that the first synchronization packet and the second synchronization packet are valid, the UPF may receive first indication information from the AMF network element, where the first indication information indicates that the first synchronization packet and the second synchronization packet are valid.

After determining that the first synchronization packet and the second synchronization packet are valid, to avoid a dual-clock phenomenon, the UPF needs to determine the to-be-forwarded synchronization packet and a to-be-filtered synchronization packet in the first synchronization packet and the second synchronization packet.

In some embodiments, the UPF may determine, based on a clock address carried in the first synchronization packet and a clock address carried in the second synchronization packet, the to-be-forwarded synchronization packet in the first synchronization packet and the second synchronization packet.

For example, when the first synchronization packet and the second synchronization packet each correspond to one source address and a plurality of destination addresses, the source address is an address of the master clock or an address of the standby master clock, and the destination address is an address of a slave clock for which timing needs to be performed. When initially accessing a 5GS, the master clock, the standby clock, and the slave clock may be bound to fixed IP/MAC addresses, and information about the master clock and the standby clock and information about bounded addresses are reported to a core network element (for example, the UPF/an SMF/an AMF). Therefore, once receiving the synchronization packets with two different addresses in the same TSN domain, the UPF may compare IP/MAC addresses of the received synchronization packets in the TSN domain with the address of the master clock and the address of the standby clock that are prestored in the TSN domain, to determine the to-be-forwarded synchronization packet in the first synchronization packet and the second synchronization packet.

A result may be: The clock address carried in the first synchronization packet is the address of the master clock, and the clock address carried in the second synchronization packet is the address of the standby clock; or the clock address carried in the first synchronization packet is the address of the standby clock, and the clock address carried in the second synchronization packet is the address of the master clock. In other words, the to-be-forwarded synchronization packet is the first synchronization packet, and a to-be-filtered synchronization packet is the second synchronization packet. Alternatively, the to-be-forwarded synchronization packet is the second synchronization packet, and a to-be-filtered synchronization packet is the first synchronization packet.

In some embodiments, the UPF may determine, based on a preconfigured filter template, the to-be-forwarded synchronization packet in the first synchronization packet and the second synchronization packet, where the filter template includes information about the master clock and/or information about the standby clock.

The information about the master clock includes at least one of a source address or an internet protocol version 6 (IPv6) prefix of the master clock, and the information about the standby clock includes at least one of a destination address or an IPv6 prefix of the clock. The source address and the destination address may be MAC addresses, IP addresses, or the like.

For example, an SMF may set the filter template based on the information about the master clock that is reported by the master clock when the master clock accesses a 5GS and/or the information about the standby clock that is reported by the standby clock when the standby clock accesses the 5GS. Then, the SMF may configure the filter template for the UPF, so that the UPF may determine the to-be-forwarded synchronization packet based on the filter template configured by the SMF. For example, when only information about at least one master clock is set in the filter template, if clock information carried in the first synchronization packet is the same as one piece of information in the information about the at least one master clock in the filter template, the UPF determines that the first synchronization packet is a synchronization packet of a master clock and is the to-be-forwarded synchronization packet, and the second synchronization packet is correspondingly a to-be-filtered packet. When only information about at least one standby clock is set in the filter template, if clock information carried in the first synchronization packet is the same as one piece of information in the information about the at least one standby clock in the filter template, the UPF determines that the first synchronization packet is a synchronization packet of a standby clock and is a to-be-filtered synchronization packet, and the second synchronization packet is correspondingly the to-be-forwarded packet.

In some embodiments, when an interval of a first time period is between a time point at which the second synchronization packet is received and a time point at which the $1^{st}$ first synchronization packet is received, and the first time period is greater than or equal to a preset time period, the UPF determines that the first synchronization packet is the to-be-forwarded synchronization packet.

It may be understood that a timer may be maintained in the UPF. Considering that a mistakenly triggered synchronization packet of the standby clock is occasional, after the master clock sends a synchronization packet to the UPF, the UPF does not receive, within a time period, a synchronization packet sent by another clock. Therefore, a timer dedicated to maintaining a service related to a master clock may be introduced in the UPF. Once the UPF receives the $1^{st}$ TSN timing packet of a node in a TSN domain, the timer is started. If the UPF does not receive, within a preset time period, a TSN packet sent by another node, the UPF may consider that the $1^{st}$ timing packet is a packet sent by a master clock, and correspondingly consider that a TSN packet that is sent by another node in the same TSN domain and that is received outside the preset time period is a mistakenly triggered TSN timing packet, so that the UPF performs a filtering operation on the mistakenly triggered timing packet.

Figure 15:
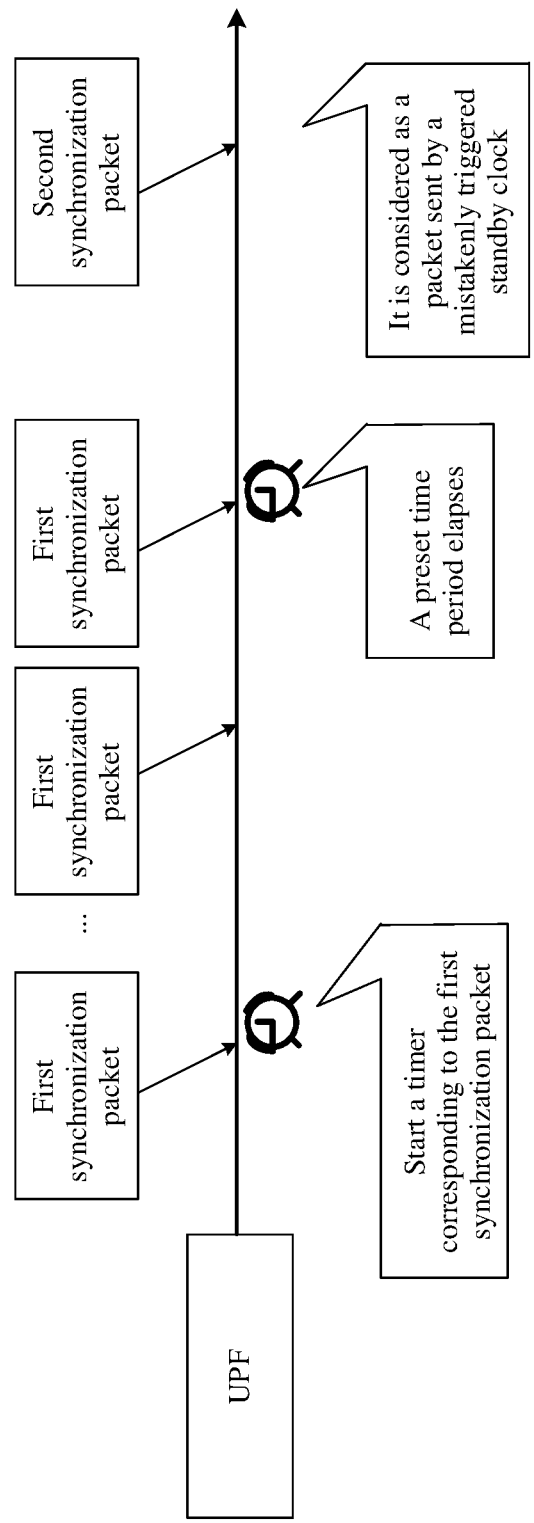
FIG. 15 is a schematic diagram of a process in which a UPF determines a master clock and a standby clock using a timer according to an embodiment of this application.

Therefore, as shown in FIG. 15, when the UPF first receives the $1^{st}$ first synchronization packet sent by the UE 1, the UPF starts a timer corresponding to the first synchronization packet. In the preset time period, if the UPF continuously receives the first synchronization packet at an equal time interval, the UPF considers that the first synchronization packet is a synchronization packet sent by the master clock. If a synchronization packet is received outside the preset time period, for example, the second synchronization packet is received outside the preset time period, the UPF considers that the second synchronization packet is a packet sent by the standby clock that is mistakenly triggered. If both the first synchronization packet sent by the UE 1 and the second synchronization packet sent by the UE 2 are received within the preset time period, the UPF may wait for a next timing periodicity to continue to determine whether the $1^{st}$ second synchronization packet is received outside the preset time period. If the $1^{st}$ second synchronization packet is received outside the preset time period, the UPF determines that the second synchronization packet is a to-be-filtered packet. The rest may be deduced by analogy. Alternatively, if both the first synchronization packet sent by the UE 1 and the second synchronization packet sent by the UE 2 are received within the preset time period, the UPF may select any synchronization packet as the to-be-forwarded synchronization packet.

The timer may be placed in the UPF. Alternatively, the timer may be placed in another core network element, and the another core network element notifies the UPF of whether the timer expires.

It should be noted that the UPF may receive a plurality of synchronization packets from different clock sources within the preset time period for determining a synchronization packet of the master clock. The UPF may maintain dedicated timers for the different clock sources. If a synchronization packet of any clock source first reaches a time threshold requirement of a timer (where the UPF continuously receives the clock packet at an equal interval within a specified time period), the UPF considers that the synchronization packet of the clock source is a synchronization packet of the master clock.

In some embodiments, the UPF may identify a synchronization packet, but does not distinguish between a synchronization packet of the master clock and a synchronization packet of the standby clock. Once the UPF receives TSN timing packets from two Ethernet addresses/IP addresses/MAC addresses in a same TSN domain, the UPF autonomously determines a synchronization packet to be used as a to-be-forwarded synchronization packet. Then, the UPF keeps forwarding a synchronization packet from the clock source corresponding to the to-be-forwarded synchronization packet, and filtering a synchronization packet from the other clock source.

It should be noted that, if the UPF receives no packet of the master clock within a timing periodicity, but receives a packet of the standby clock outside the timing periodicity, the UPF may directly forward the synchronization packet of the standby clock without performing a filtering operation for the standby clock, that is, directly enable the standby clock. For example, the first synchronization packet sent by the UE 1 is a packet of the master clock, and the second synchronization packet sent by the UE 2 is a packet of the standby clock. If the UPF does not receive, within a timing periodicity, the first synchronization packet sent by the UE 1, but receives, outside the timing periodicity, the second synchronization packet sent by the UE 2, the UPF may directly forward the second synchronization packet, that is, directly enable the standby clock on the UE 2 side.

In some embodiments, when a TSN link of the master clock is abnormal, and a TSN node in which the standby clock is located autonomously determines whether to enable the standby clock, that the TSN link of the master clock is abnormal includes one of the following faults or a combination of a plurality of faults in the following faults:

(1) The TSN master clock is internally faulty or an internal link of the TSN master clock is faulty.
(2) A link between the TSN master clock and a TSN node (a first TSN node) is faulty.
(3) The TSN node is internally faulty.
(4) A link between the first TSN node and a DS-TT connected to the UE 1 is faulty.
(5) A link between the UE 1 and the DS-TT is faulty (usually, the DS-TT is a module inside the UE 1, and herein, it may be understood as that a circuit module related to the DS-TT inside the UE 1 is faulty).
(6) The UE 1 is internally faulty.
(7) An air interface between the UE 1 and a gNB (NG-RAN) is interrupted.
(8) A link between the gNB and the UPF is faulty.
(9) A link between the UPF and an NW-TT is faulty.
(10) A wired link between the NW-TT and a TSN system server is faulty.
(11) A link between the TSN system server and the master clock connected to the TSN system server is faulty.

Link exception situations corresponding to the network architecture shown in FIG. 11 may include (1) to (8), link exception situations corresponding to the network architecture shown in FIG. 12 may include (1) to (8), and link exception situations corresponding to the network architecture shown in FIG. 13 may include (1), (9), (10), and (11).

Step 159: The UPF sends the first synchronization packet to UE 3, or the UPF sends the second synchronization packet to the UE 3.

FIG. 15 shows only an example of sending the first synchronization packet to the UE 3. In this way, the node 3 on the link of the UE 3 may perform time synchronization based on the first synchronization packet.

According to this embodiment, in this application, when a TSN timing link is abnormal, the core network device UPF may determine a to-be-forwarded synchronization packet and a to-be-filtered synchronization packet in a synchronization packet of a master clock and a mistakenly triggered synchronization packet of a standby clock, to avoid a dual-clock phenomenon in a TSN domain, in other words, to prevent a slave clock from receiving clock signals from two clock sources, and avoid introducing a synchronization error between different clocks to reduce synchronization precision of a TSN node.

However, in the current technology, the UPF filters a TSN packet without considering a dual-clock situation. In addition, in the current technology, active and standby clocks of nodes are derived by using a BMCA algorithm (as described in step 2), but are not predefined. In this embodiment, it is considered that the SMF configures a template for the UPF to filter out the standby clock that performs a misoperation. In addition, it is also considered that sensing of the UPF for a TSN packet is enhanced, so that the UPF is capable of sensing and determining whether the TSN packet is a timing packet and whether the TSN packet is a synchronization packet of the master clock. Therefore, different from the current technology, this embodiment of this application may bring the following gains:

(1) When receiving synchronization packets of two clocks before performing synchronization packet forwarding, the UPF first filters a synchronization packet, and does not need to deliver both the two packets to a TSN server or an air interface, so that signaling exchange and air interface overheads are reduced. (2) In an active/standby clock mechanism, the enhanced UPF can determine the synchronization packet of the master clock and the synchronization packet of the standby clock in a timely manner, in other words, can determine the master clock and the standby clock in a process of sending a synchronization packet flow. Compared with the BMCA algorithm with slow convergence that is currently executed before the synchronization packet flow is sent, in this application, the master clock and the standby clock can be determined in the process of sending the synchronization packet flow, and time convergence of the master clock and the standby clock is faster.

Figure 16:
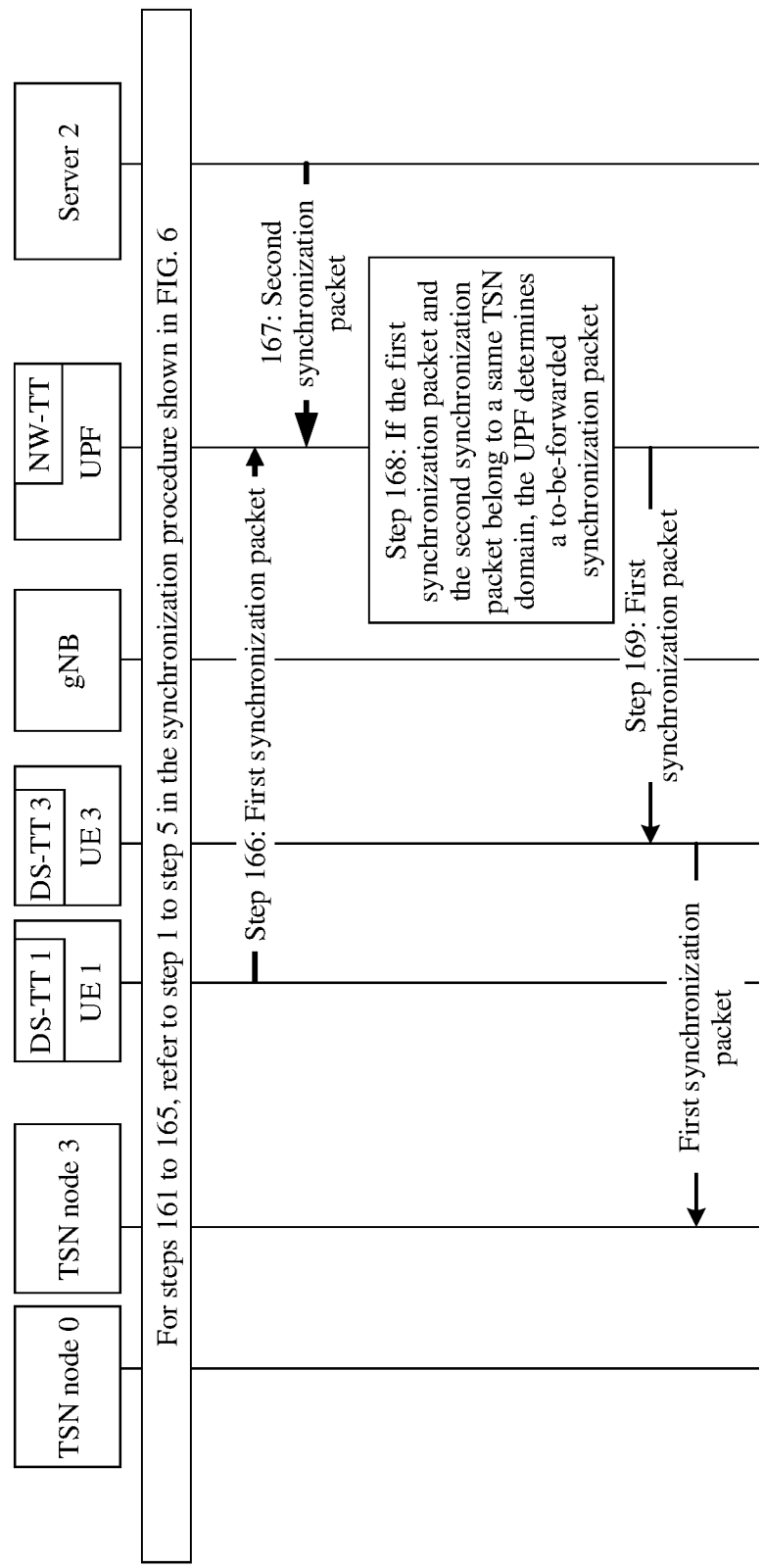
FIG. 16 is a schematic flowchart of a timing method for dealing with a link exception according to an embodiment of this application.

An embodiment of this application provides a timing method for dealing with a link exception. The method may be applied to the network architecture shown in FIG. 12, and the method may be applied to a core network device or a chip in the core network device. That the core network device is a UPF, and a master clock on a UE side performs timing for a slave clock on another UE side is used as an example. As shown in FIG. 16, the method may include the following steps.

Steps 161 to 165 are similar to step 1 to step 5 in the synchronization procedure shown in FIG. 6. For details, refer to the descriptions of steps 151 to 155.

166: The UPF receives a first synchronization packet from a first terminal device.

An implementation of step 166 is similar to the implementation of step 156.

167: The UPF receives a second synchronization packet from a server.

In FIG. 16, the server in step 167 is shown as a server 2. In step 167, for processing of the second synchronization packet by the UPF, refer to the descriptions in step 156.

168: If the first synchronization packet and the second synchronization packet belong to a same TSN domain, the UPF determines a to-be-forwarded synchronization packet in the first synchronization packet and the second synchronization packet.

In step 168, for a manner in which the UPF determines the to-be-forwarded synchronization packet in the first synchronization packet and the second synchronization packet, refer to step 158. In other words, a manner in which the UPF processes the second synchronization packet sent by the server 2 is similar to the manner in which the UPF processes the second synchronization packet sent by the UE 2.

169: The UPF sends the first synchronization packet to UE 3, or the UPF sends the second synchronization packet to the UE 3.

FIG. 16 shows only an example of sending the first synchronization packet to the UE 3.

For beneficial effects of this embodiment, refer to the beneficial effects of the embodiment corresponding to FIG. 14.

Figure 17:
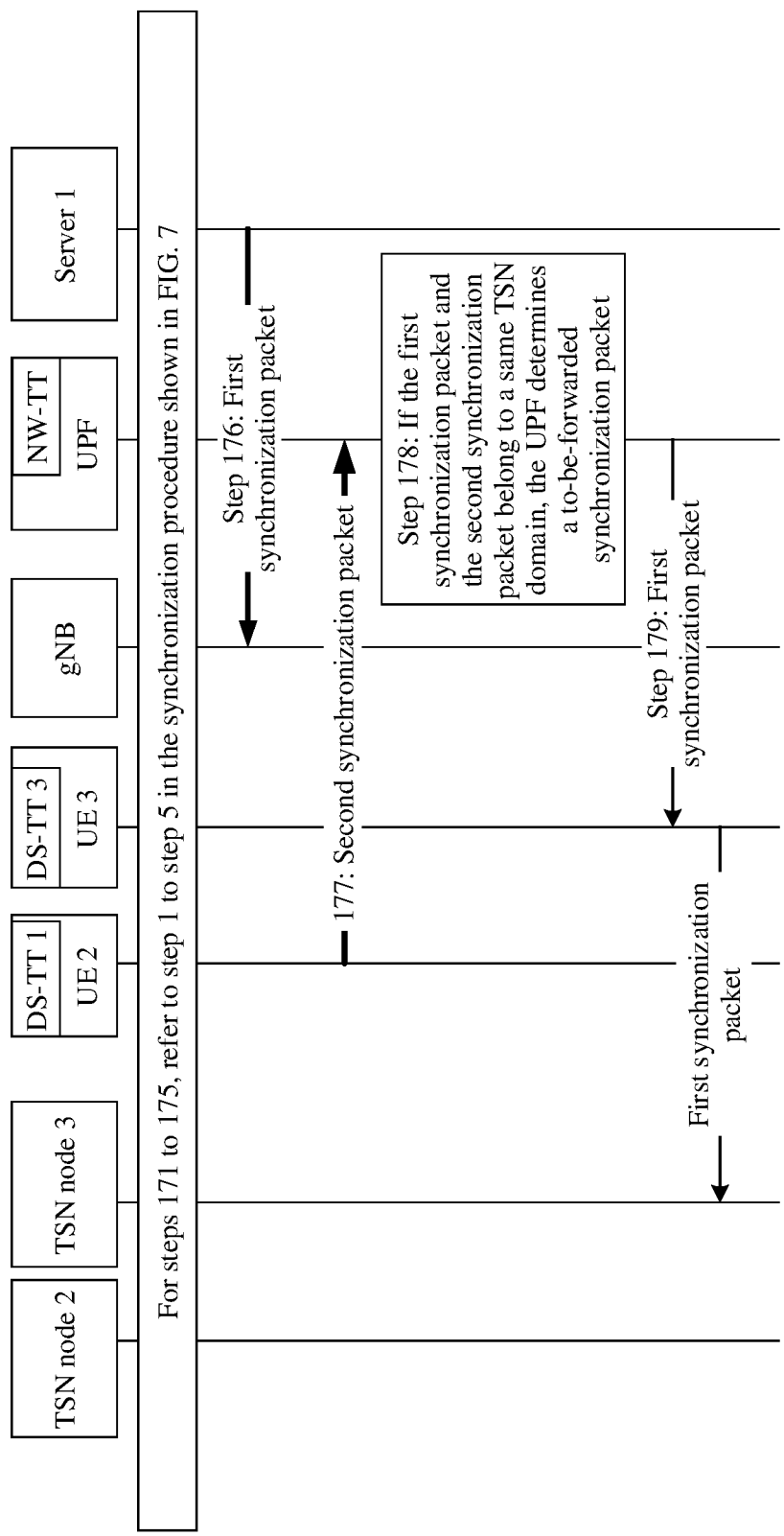
FIG. 17 is a schematic flowchart of a timing method for dealing with a link exception according to an embodiment of this application.

An embodiment of this application provides a timing method for dealing with a link exception. The method may be applied to the network architecture shown in FIG. 13, and the method may be applied to a core network device or a chip in the core network device. That the core network device is a UPF, and a master clock on a server side performs timing for a slave clock on a UE side is used as an example. As shown in FIG. 17, the method may include the following steps.

Steps 171 to 175 are similar to step 1 to step 5 in the synchronization procedure shown in FIG. 7. For details, refer to the descriptions of steps 151 to 155.

176: The UPF receives a first synchronization packet from a server.

In FIG. 17, the server in step 176 is shown as a server 1. A manner in which the UPF processes the first synchronization packet is similar to the implementation of step 156.

177: The UPF receives a second synchronization packet from a second terminal device.

In FIG. 17, the second terminal device is shown as UE 2. In step 177, for processing of the second synchronization packet by the UPF, refer to the descriptions in step 156.

178: If the first synchronization packet and the second synchronization packet belong to a same TSN domain, the UPF determines a to-be-forwarded synchronization packet in the first synchronization packet and the second synchronization packet.

In step 178, for a manner in which the UPF determines the to-be-forwarded synchronization packet in the first synchronization packet and the second synchronization packet, refer to step 158.

179: The UPF sends the first synchronization packet to UE 3, or the UPF sends the second synchronization packet to the UE 3.

FIG. 17 shows only an example of sending the first synchronization packet to the UE 3.

For beneficial effects of this embodiment, refer to the beneficial effects of the embodiment corresponding to FIG. 14. The following describes other implementations in embodiments of this application. Compared with the foregoing embodiments in which the standby clock autonomously determines whether to enable the standby clock, these embodiments focus on assigning a role of determining whether to enable a standby clock to a network element in a 5GS. To be specific, the network element in the 5GS senses a link exception and indicates a standby TSN node to enable the standby clock.

Figure 18:
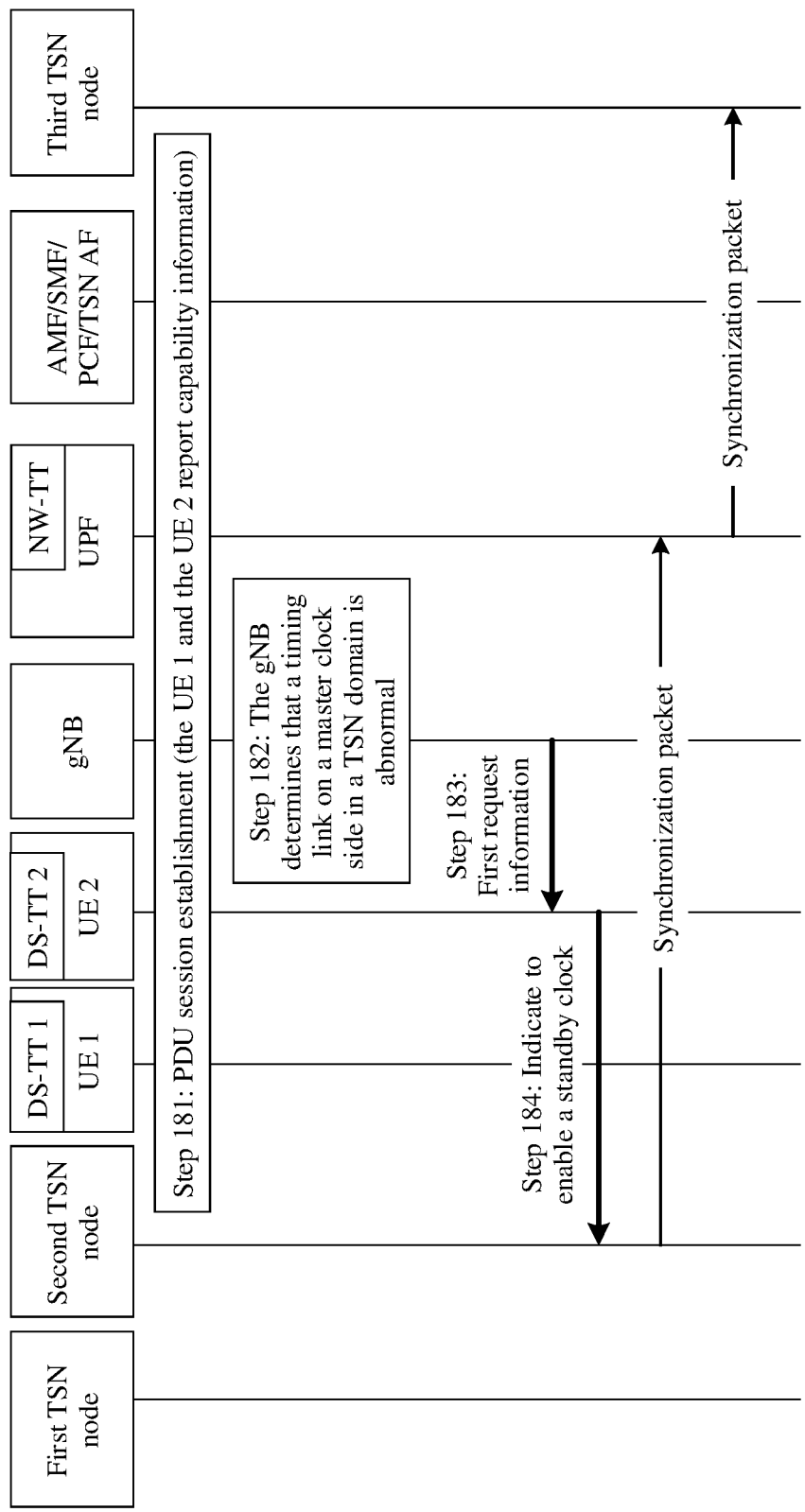
FIG. 18 is a schematic flowchart of a timing method for dealing with a link exception according to an embodiment of this application.

An embodiment of this application provides a timing method for dealing with a link exception. The method is applied to an access network device or a chip in the access network device. That the access network device is a gNB is used as an example. As shown in FIG. 18, that one of UE 1 and UE 2 is connected to a master clock, the other one of the UE 1 and the UE 2 is connected to a standby clock, the UE 1 is connected to a clock in a first TSN node, the UE 2 is connected to a clock in a second TSN node, and a third TSN node is a slave node is used as an example, and the method includes the following steps.

Step 181: The gNB receives first capability information from the first terminal device UE 1 and second capability information from the second terminal device UE 2, where the first capability information indicates that the first time sensitive network TSN node connected to the UE 1 has a synchronous timing capability, a first TSN terminal is the master clock, the second capability information indicates that the second TSN node connected to the UE 2 has a timing capability, and a second TSN terminal is the standby clock.

In some embodiments, step 181 may be implemented in a process in which the UE 1 and the UE 2 establish or update PDU sessions with the access network device and a core network device. To be specific, the UE 1 may send a capability indication to the access network device and the core network device, where the capability indication includes the first capability information. An implementation of the UE 2 is similar to that of the UE 1.

Step 182: The gNB determines that a timing link on a master clock side in a TSN domain is abnormal.

In some embodiments, if the gNB receives no synchronization packet from the UE 1 within a preset time period, the access network device determines that the timing link on the master clock side is abnormal.

In other words, a timer may be maintained in the gNB. If the gNB determines that no synchronization packet from the UE 1 is received within a preset time period of the timer, the gNB may consider that the timing link on the master clock side is abnormal.

In some embodiments, the gNB may analyze, through an artificial intelligence (AI) module, a factor that affects a signal of the UE 1. When an analysis result is that no synchronization packet from the UE 1 can be received within a future preset time period, the gNB determines that the timing link on the master clock side in the TSN domain is abnormal.

For example, through the AI module, the gNB may analyze parameters such as a weather forecast and a vehicle traffic volume, predict a factor, for example, air interface channel quality, that affects a receiving channel of the UE 1, and determine whether a synchronization packet from the UE 1 can be received within the future preset time period. If determining that no synchronization packet from the UE 1 can be received within the future preset time period, the gNB determines that the timing link on the master clock side is abnormal.

In some embodiments, when receiving second request information from the first terminal device, where the second request information indicates to replace the master clock, the gNB determines that the timing link on the master clock side in the TSN domain is abnormal.

For example, UE connected to the master clock side may determine whether the master clock needs to be replaced. If determining that the master clock needs to be replaced, the UE 1 may send a second request message to the gNB, to indicate to replace the master clock. The gNB may determine, based on the second request message, that the timing link on the master clock side is abnormal.

In some embodiments, the gNB receives third request information from the second terminal device, where the third request information indicates to replace the master clock. When the third request information is valid, and the access network device receives no synchronization packet from the first terminal device, the gNB determines that the timing link on the master clock side in the TSN domain is abnormal.

For example, the UE 2 on a standby clock side may also determine whether the timing link on the master clock side is abnormal. If determining that the timing link is abnormal, the UE 2 may also send the third request information to the gNB, to indicate that the master clock needs to be replaced. When receiving the third request message, the gNB may first determine whether the third request information is valid, because a dual-clock phenomenon may occur. Therefore, if the gNB receives no synchronization packet from the UE 1 within a preset time period, the gNB determines that the third request information is valid; if the gNB can still receive a synchronization packet from the UE 1 within a preset time period, the gNB may consider that the third request information is invalid and may be malicious attack information. Then, when the gNB determines that the third request information is valid, the gNB may consider that the timing link on the master clock side is abnormal.

Step 183: The gNB sends first request information to the UE 2 in the TSN domain, where the first request information indicates to replace the master clock in the TSN domain with the standby clock in the TSN domain.

For example, the gNB may first allocate an uplink resource to the UE 2, and send a resource allocation indication to the UE by using a message, for example, a radio resource control (RRC) message or a physical downlink control channel (PDCCH) message, so that the UE 2 may send a synchronization packet of the standby clock on a UE 2 side based on the uplink resource. In addition, an N3 resource further needs to be reserved between the gNB and a UPF, and the N3 resource is used by the UE 2 to transmit a TSN timing packet.

Step 184: The UE 2 indicates the second TSN node to enable the standby clock.

In some embodiments, when receiving the first request information, the UE 2 may indicate, in a suffix field of the first request information through a DS-TT, the second TSN node to enable the standby clock. There may be a plurality of implementations of a structure of the suffix field. For example, the UE 2 may add a "type-length-value (TLV) type" field to the suffix field, where the "TLV type" field is used to indicate "to enable the standby clock". A "length of TLV" field may be further added after the TLV type field, and is used to indicate length information of the suffix field. Alternatively, the UE 2 may add an "organization Id" field to the suffix field, where the "organization Id" field is used to indicate to enable the standby clock. Alternatively, the UE 2 may add an "organization subtype" field to the suffix field, where the "organization subtype" field is used to indicate to enable the standby clock. Alternatively, the UE 2 may add one octet to the suffix field, where the octet is used to indicate to enable the standby clock.

Then, the UE 2 may send, to the second TSN node, the first request information to which the suffix field is added. The second TSN node may send a synchronization packet to the UPF through the UE 2 and the gNB. Then, the UPF sends the synchronization packet to the third TSN node for time synchronization.

Therefore, in this embodiment of this application, when the timing link on the master clock side is abnormal, the gNB in a 5GS may be assigned with a role of sensing a link exception and indicating to enable the standby clock. In this way, a 5G air interface link disconnection problem can be resolved more quickly and directly, and a risk of timing interruption in a TSN network can be reduced.

Figure 19:
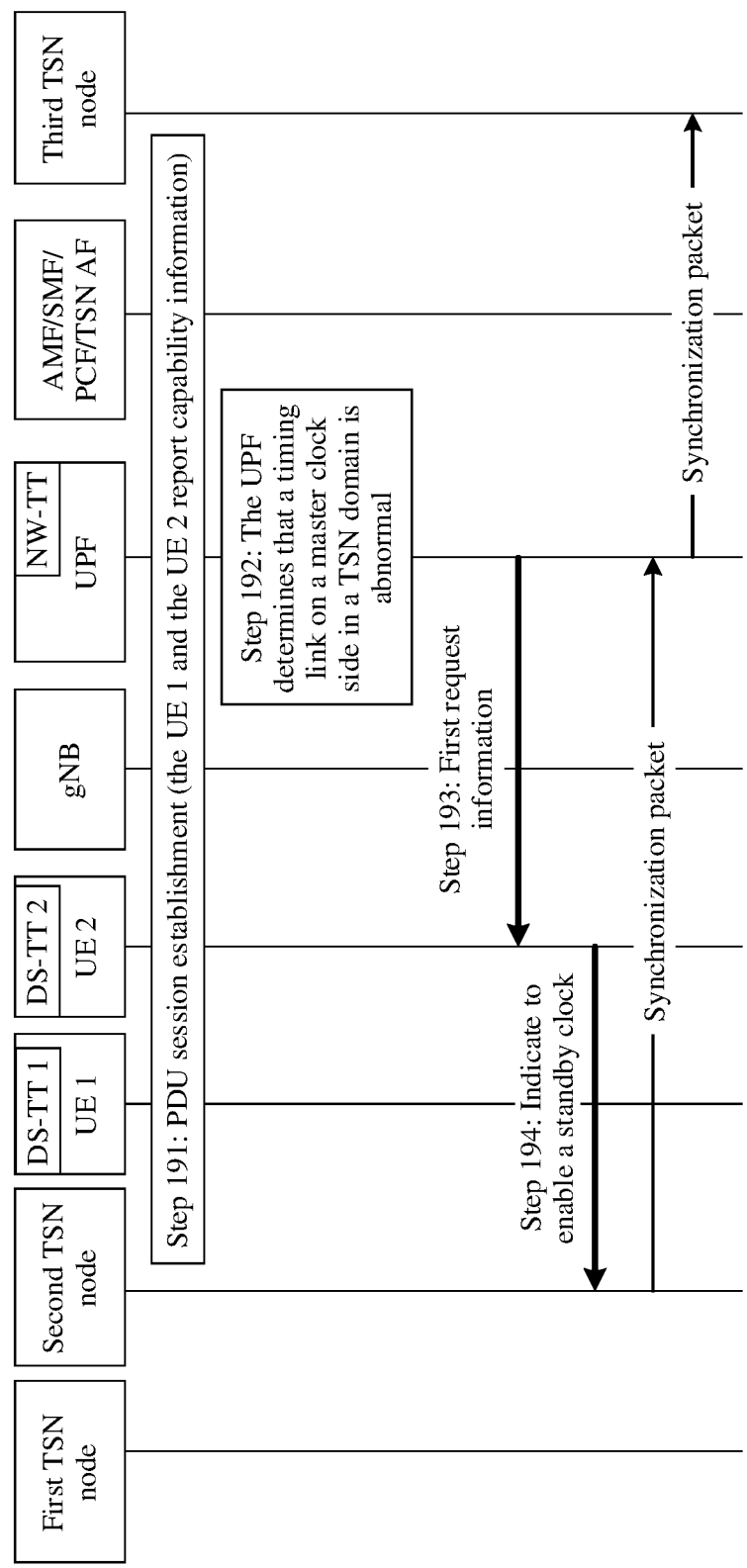
FIG. 19 is a schematic flowchart of a timing method for dealing with a link exception according to an embodiment of this application.

An embodiment of this application further provides a timing method for dealing with a link exception. The method is applied to a core network device or a chip in the core network device. That the core network device is a UPF is used as an example. As shown in FIG. 19, the method includes the following steps.

Step 191: The UPF receives first capability information from a first terminal device UE 1 and second capability information from a second terminal device UE 2, where the first capability information indicates that a first time sensitive network TSN node connected to the UE 1 has a synchronous timing capability, a first TSN terminal is a master clock, the second capability information indicates that a second TSN node connected to the UE 2 has a timing capability, and a second TSN terminal is a standby clock.

For an implementation of step 191, refer to the implementation of the gNB in step 181.

Step 192: The UPF determines that a timing link on a master clock side in a TSN domain is abnormal.

It some embodiments, a timer may be maintained in the UPF. When the UPF determines that no synchronization packet from the UE 1 is received within a preset time period of timing of the timer, the UPF may consider that the timing link on the master clock side is abnormal.

In some embodiments, the UPF receives second request information from the UE 1 or the UE 2, where the second request information indicates to replace the master clock. When the second request information is valid, the UPF determines that the timing link on the master clock side in the TSN domain is abnormal. Similar to the solution for the gNB, determining that the second request information is valid is to avoid a dual-clock phenomenon.

Step 193: The UPF sends first request information to the UE 2 in the TSN domain, where the first request information indicates to replace the master clock in the TSN domain with the standby clock in the TSN domain.

For example, the UPF sends the first request information to the UE 2 through a gNB.

Step 194: The UE 2 indicates the second TSN node to enable the standby clock.

For an implementation of step 194, refer to step 184.

Therefore, in this embodiment of this application, when the timing link on the master clock side is abnormal, the UPF in a 5GS may be assigned with a role of sensing a link exception and indicating to enable the standby clock. In this way, a 5G air interface link disconnection problem can be resolved more quickly and directly, and a risk of timing interruption in a TSN network can be reduced.

Figure 20:
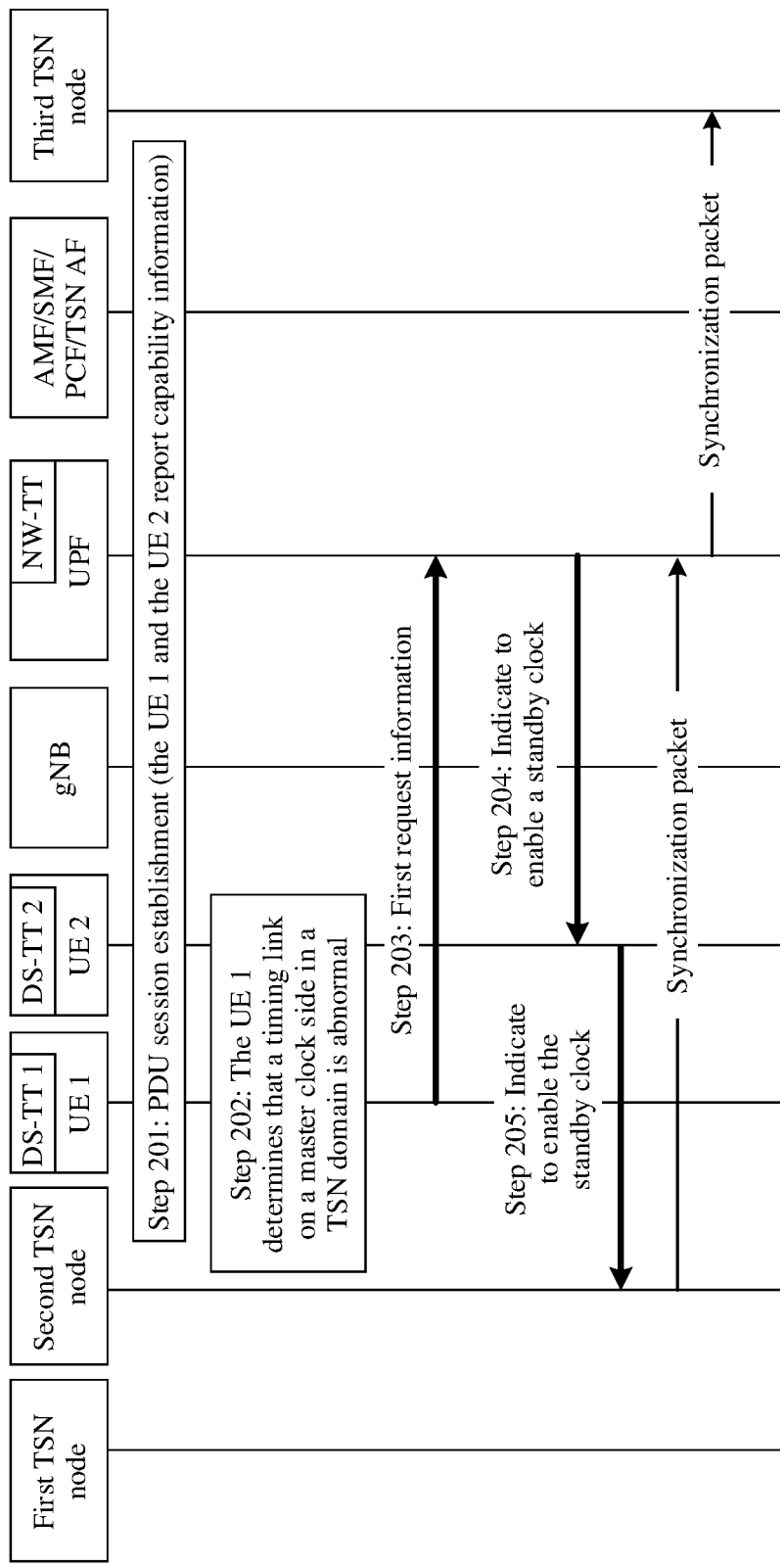
FIG. 20 is a schematic flowchart of a timing method for dealing with a link exception according to an embodiment of this application.

An embodiment of this application further provides a timing method for dealing with a link exception. The method is applied to a terminal device or a chip in the terminal device. That the terminal device is UE 1 on a master clock side is used as an example. As shown in FIG. 20, the method includes the following steps.

Step 201: The UE 1 sends first capability information to a core network device UPF, where the first capability information indicates that a first TSN node connected to the UE 1 has a synchronous timing capability, and the first TSN node is a master clock.

UE 2 also sends second capability information to the UPF, where the second capability information indicates that a second TSN node connected to the UE 2 has a timing capability, and the second TSN node is a standby clock.

Step 202: The UE 1 determines that a timing link on the master clock side in a time sensitive network TSN domain is abnormal.

In some embodiments, when the UE 1 receives no synchronization packet from the master clock within a preset time period, the UE 1 determines that the timing link on the master clock side is abnormal. To be specific, if a clock of the first TSN node connected to the UE 1 is a master clock, and a timer is maintained in the UE 1, once the UE 1 determines that no synchronization packet of the first TSN node is received within a preset time period of timing of the timer, the UE 1 considers that the timing link on the master clock side is abnormal.

Step 203: The UE 1 sends first request information to the core network device UPF, where the first request information indicates to replace the master clock in the TSN domain with the standby clock in the TSN domain.

The UE 1 may send the first request information to the UPF through a gNB. For example, the UE 1 may send the first request information to the gNB by sending dedicated signaling, for example, RRC signaling. Alternatively, the UE 1 may directly indicate, by using a dedicated radio network temporary identifier (RNTI), a dedicated uplink resource, or the like, the gNB to enable the standby clock.

Step 204: The UPF indicates the UE 2 to enable the standby clock.

Step 205: The UE 2 indicates the second TSN node to enable the standby clock.

For an implementation of step 205, refer to step 184.

Therefore, in this embodiment of this application, when the timing link on the master clock side is abnormal, the terminal device UE 1 on the master clock side in a 5GS may be assigned with a role of sensing a link exception and indicating to enable the standby clock. In this way, a 5G air interface link disconnection problem can be resolved more quickly and directly, and a risk of timing interruption in a TSN network can be reduced.

Figure 21:
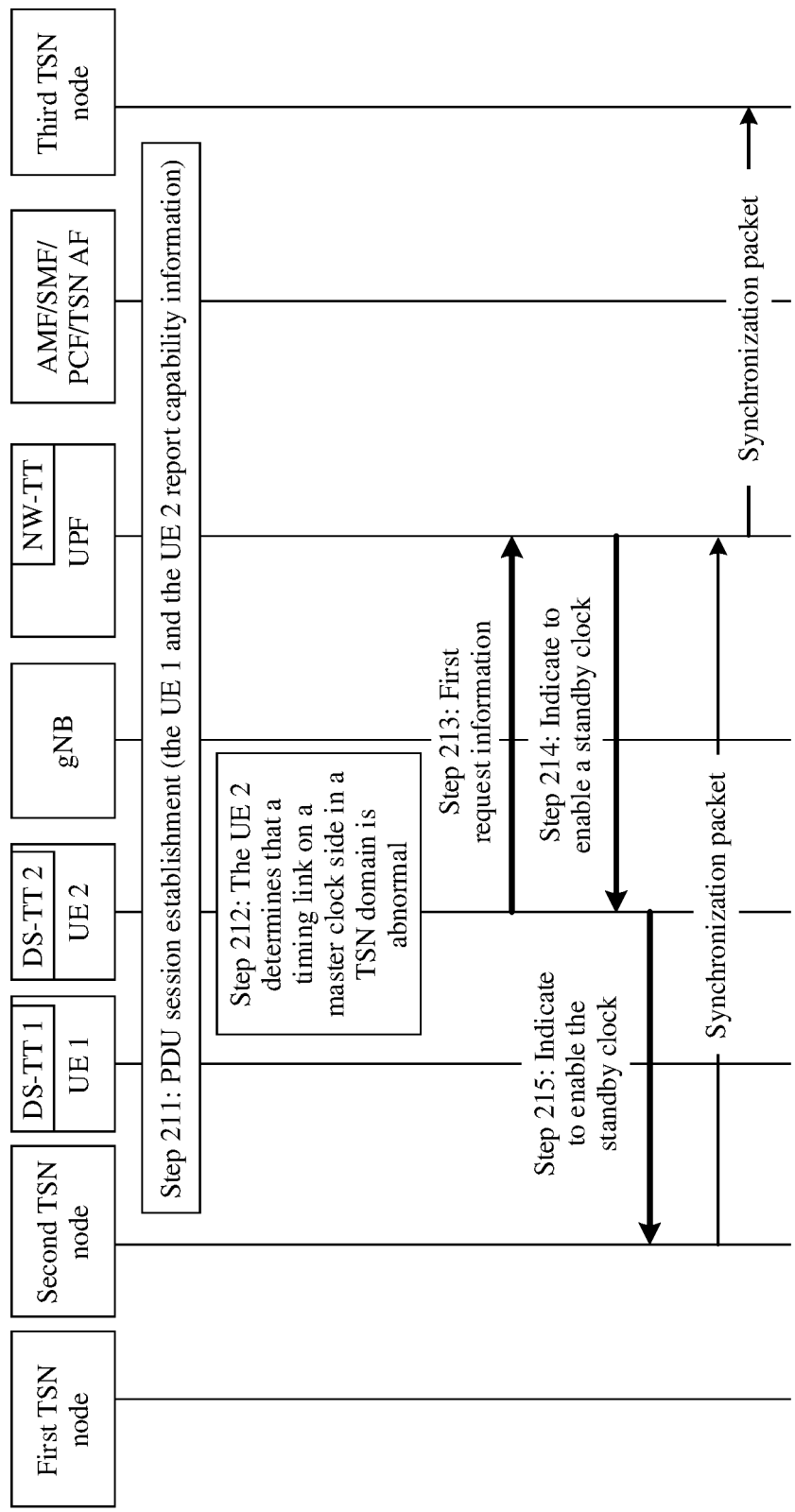
FIG. 21 is a schematic flowchart of a timing method for dealing with a link exception according to an embodiment of this application.

An embodiment of this application further provides a timing method for dealing with a link exception. The method is applied to a terminal device or a chip in the terminal device. That the terminal device is UE 2 on a standby clock side is used as an example. As shown in FIG. 21, the method includes the following steps.

Step 211: The UE 2 sends second capability information to a core network device UPF, where the second capability information indicates that a second TSN node connected to the terminal device has a timing capability, and the second TSN node is a standby clock.

UE 1 also sends first capability information to the UPF, where the first capability information indicates that a first TSN node connected to the UE 1 has a synchronous timing capability, and the first TSN node is a master clock.

Step 212: The UE 2 determines that a timing link on a master clock side in a time sensitive network TSN domain is abnormal.

In some embodiments, a timer may be maintained in the UE 2. The UE 2 needs to periodically receive a sleep instruction of the master clock sent by a gNB, and send the sleep instruction to the standby clock, to prevent the standby clock from being enabled. Therefore, once the UE 2 receives, within a preset time period of timing of the timer, no sleep instruction sent by the gNB, the UE 2 determines that the timing link on the master clock side is abnormal.

Step 213: The UE 2 sends first request information to the core network device, where the first request information indicates to replace the master clock in the TSN domain with the standby clock in the TSN domain.

The UE 2 may send the first request information to the UPF through the gNB, to request to replace the master clock. When receiving the first request information, the UPF first needs to determine whether the first request information is valid. For a manner of determining whether the first request information is valid, refer to the manner of determining, by the gNB, whether the third request information is valid in step 182.

Step 214: The UPF indicates the UE 2 to enable the standby clock.

If the UPF determines that the first request information is valid, the UPF may send an indication for enabling the standby clock to the UE 2. The UE 2 may indicate to enable the standby clock in manners such as sending RRC, a dedicated RNTI, a scrambled scheduling request, or a buffer status report (BSR) to the gNB or requesting the gNB for a dedicated uplink resource used to transfer a TSN timing packet.

Step 215: The UE 2 indicates the second TSN node to enable the standby clock.

For an implementation of step 215, refer to step 184.

Therefore, in this embodiment of this application, when the timing link on the master clock side is abnormal, the terminal device UE 2 on the standby clock side in a 5GS may be assigned with a role of sensing a link exception and indicating to enable the standby clock. In this way, a 5G air interface link disconnection problem can be resolved more quickly and directly, and a risk of timing interruption in a TSN network can be reduced.

It should be noted that in the embodiments corresponding to FIG. 18 to FIG. 21, the UE 1 may be replaced with a server 1, and the UE 2 may also be replaced with a server 2. A difference lies in that the server 1 and the server 2 may directly communicate with the UPF without using the gNB.

It may be understood that, to implement the foregoing functions, the core network device includes corresponding hardware and/or software modules for performing the foregoing functions. With reference to algorithm steps of each example described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the core network device may be divided into functional modules based on the foregoing method examples. For example, each functional module may be obtained through division based on each corresponding function, or two or more functions may be integrated into one processing module. The integrated module may be implemented in a form of hardware. It should be noted that, in embodiments, division into the modules is an example, and is merely logical function division. During actual implementation, another division manner may be used.

Figure 22:
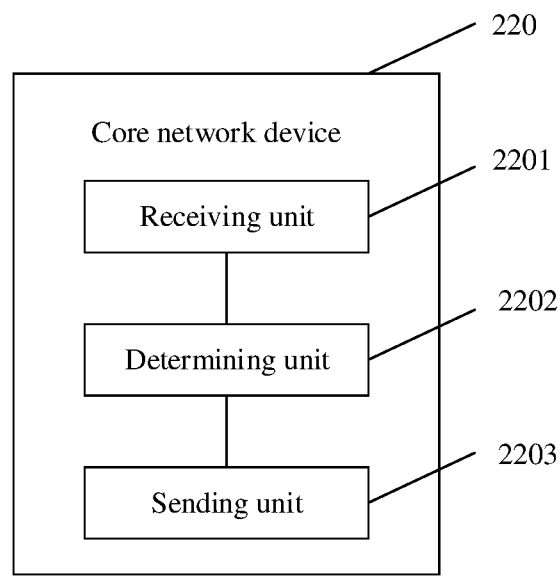
FIG. 22 is a schematic diagram of a structure of a core network device according to an embodiment of this application.

When each functional module is obtained through division based on each corresponding function, FIG. 22 is a schematic diagram of a possible composition of a core network device 220 in the foregoing embodiments. As shown in FIG. 22, the core network device 220 may include a receiving unit 2201, a determining unit 2202, and a sending unit 2203.

The receiving unit 2201 may be configured to support the core network device 220 in performing the foregoing step 156, step 157, step 191, and the like, and/or another process of the technology described in this specification.

The determining unit 2202 may be configured to support the core network device 220 in performing the foregoing step 158, step 192, and the like, and/or another process of the technology described in this specification.

The sending unit 2203 may be configured to support the core network device 220 in performing the foregoing step 159, step 193, and the like, and/or another process of the technology described in this specification.

It should be noted that all related content of the steps in the foregoing method embodiments may be cited in function descriptions of corresponding functional modules. Details are not described herein again.

The core network device 220 provided in this embodiment is configured to perform the foregoing timing method for dealing with a link exception, and therefore can achieve same effects as the foregoing implementation method.

Figure 23:
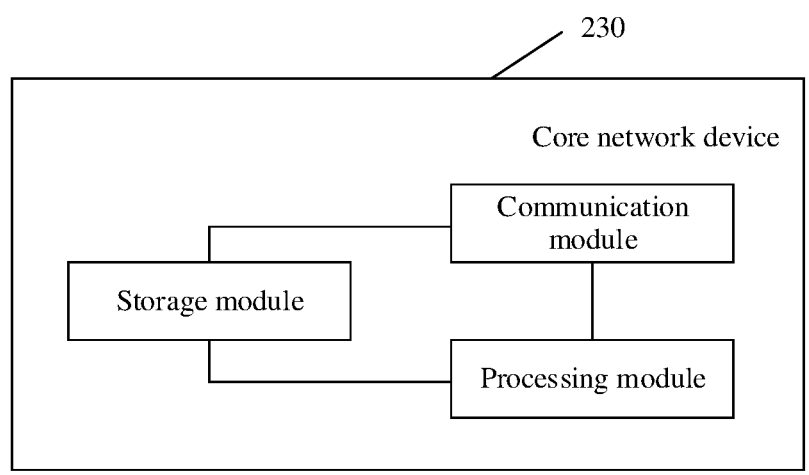
FIG. 23 is a schematic diagram of a structure of a core network device according to an embodiment of this application.

When an integrated unit is used, as shown in FIG. 23, a core network device 230 may include a processing module, a storage module, and a communication module. The processing module may be configured to control and manage an action of the core network device 230, for example, may be configured to support the core network device 230 in performing the steps performed by the determining unit 2202. The storage module may be configured to support the core network device 230 in storing program code, data, and the like. The communication module may be configured to support the core network device 230 in communicating with another device, for example, communicating with a wireless access device and a terminal device.

The processing module may be a processor or a controller. The processing module may implement or perform various example logical blocks, modules, and circuits described with reference to content disclosed in this application. The processor may alternatively be a combination of processors implementing a computing function, for example, a combination of one or more microprocessors, or a combination of a digital signal processor (DSP) and a microprocessor. The storage module may be a memory. The communication module may be specifically a device, for example, a radio frequency circuit, a Bluetooth chip, or a Wi-Fi chip, that interacts with another electronic device.

Figure 24:
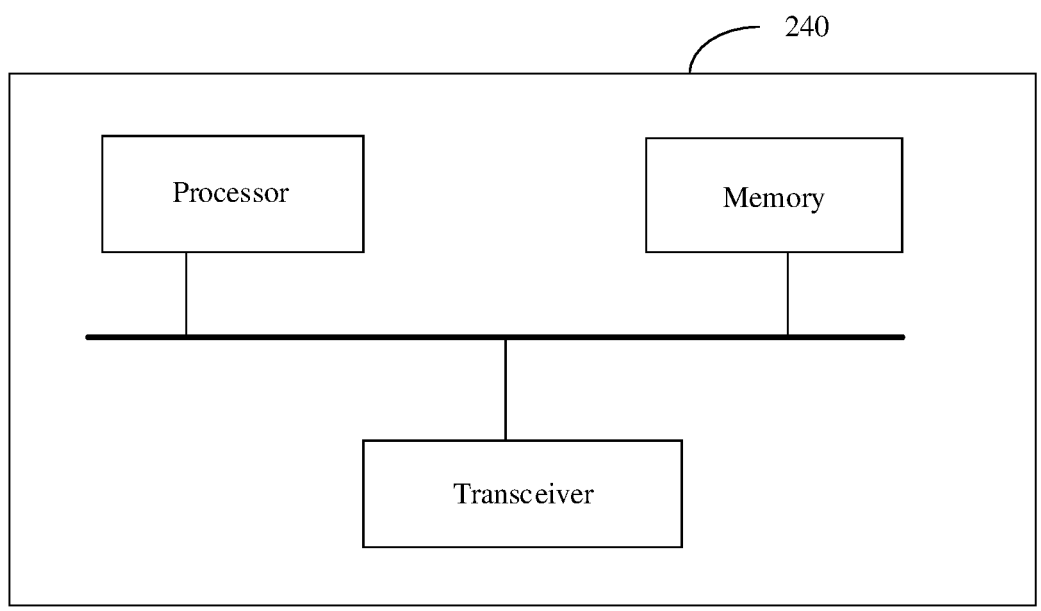
FIG. 24 is a schematic diagram of a structure of a core network device according to an embodiment of this application.

In an embodiment, when the processing module is a processor, the storage module is a memory, and the communication module is a transceiver, the core network device in this embodiment may be a UPF having a structure shown in FIG. 24.

When each functional module is obtained through division based on each corresponding function, for a schematic diagram of a possible composition of the access network device in the foregoing embodiments, still refer to a structure of the core network device 220. Similarly, the access network device may include a receiving unit, a determining unit, and a sending unit.

The receiving unit of the access network device may be configured to support the access network device in performing the foregoing step 181 and the like, and/or another process of the technology described in this specification.

The determining unit 2202 of the access network device may be configured to support the access network device in performing the foregoing step 182 and the like, and/or another process of the technology described in this specification.

The sending unit 2203 of the access network device may be configured to support the access network device in performing the foregoing step 183 and the like, and/or another process of the technology described in this specification.

It should be noted that all related content of the steps in the foregoing method embodiments may be cited in function descriptions of corresponding functional modules. Details are not described herein again.

The access network device provided in this embodiment is configured to perform the foregoing timing method for dealing with a link exception, and therefore can achieve same effects as the foregoing implementation method.

When an integrated unit is used, the access network device may include a processing module, a storage module, and a communication module. The processing module may be configured to control and manage an action of the access network device, for example, may be configured to support the access network device in performing the steps performed by the determining unit of the access network device. The storage module may be configured to support the access network device in storing program code, data, and the like. The communication module may be configured to support the access network device in communicating with another device, for example, communicating with a core network device and a terminal device.

The processing module of the access network device may be a processor or a controller. The processing module may implement or perform various example logical blocks, modules, and circuits described with reference to content disclosed in this application. The processor of the access network device may alternatively be a combination of processors implementing a computing function, for example, a combination of one or more microprocessors, or a combination of a DSP and a microprocessor. The storage module of the access network device may be a memory. The communication module of the access network device may be specifically a device, for example, a radio frequency circuit, a Bluetooth chip, or a Wi-Fi chip, that interacts with another electronic device.

In an embodiment, when the processing module of the access network device is a processor, the storage module of the access network device is a memory, and the communication module of the access network device is a transceiver, the access network device in this embodiment may be a gNB having a structure similar to that shown in FIG. 24.

When each functional module is obtained through division based on each corresponding function, for a schematic diagram of a possible composition of the terminal device in the foregoing embodiments, still refer to a structure of the core network device 220. Similarly, the terminal device may include a receiving unit, a determining unit, and a sending unit.

The receiving unit of the terminal device may be configured to support the terminal device in performing a sending process of the first terminal device and/or a sending process of the second terminal device and the like, and/or another process of the technology described in this specification.

The determining unit of the terminal device may be configured to support the terminal device in performing the foregoing step 202, step 212, and the like, and/or another process of the technology described in this specification.

The sending unit of the terminal device may be configured to support the terminal device in performing the foregoing step 184, step 201, step 203, step 205, step 211, step 213, step 215, and the like, and/or another process of the technology described in this specification.

It should be noted that all related content of the steps in the foregoing method embodiments may be cited in function descriptions of corresponding functional modules. Details are not described herein again.

The terminal device provided in this embodiment is configured to perform the foregoing timing method for dealing with a link exception, and therefore can achieve same effects as the foregoing implementation method.

When an integrated unit is used, the terminal device may include a processing module, a storage module, and a communication module. The processing module may be configured to control and manage an action of the terminal device, for example, may be configured to support the terminal device in performing the steps performed by the determining unit of the terminal device. The storage module may be configured to support the terminal device in storing program code, data, and the like. The communication module may be configured to support the terminal device in communicating with another device, for example, communicating with a core network device, an access network device, and a TSN device.

The processing module of the terminal device may be a processor or a controller. The processing module may implement or perform various example logical blocks, modules, and circuits described with reference to content disclosed in this application. The processor of the terminal device may alternatively be a combination of processors implementing a computing function, for example, a combination of one or more microprocessors, or a combination of a DSP and a microprocessor. The storage module of the terminal device may be a memory. The communication module of the terminal device may be specifically a device, for example, a radio frequency circuit, a Bluetooth chip, or a Wi-Fi chip, that interacts with another electronic device.

In an embodiment, when the processing module of the terminal device is a processor, the storage module of the terminal device is a memory, and the communication module of the terminal device is a transceiver, the terminal device in this embodiment may be UE having a structure similar to that shown in FIG. 24.

An embodiment of this application further provides an electronic device, including one or more processors and one or more memories. The one or more memories are coupled to the one or more processors. The one or more memories are configured to store computer program code, where the computer program code includes computer instructions. When the one or more processors execute the computer instructions, the electronic device is enabled to perform the foregoing related method steps to implement the timing method for dealing with a link exception in the foregoing embodiments.

An embodiment of this application further provides a computer storage medium. The computer storage medium stores computer instructions. When the computer instructions are run on an electronic device, the electronic device is enabled to perform the foregoing related method steps to implement the timing method for dealing with a link exception in the foregoing embodiments.

An embodiment of this application further provides a computer program product. When the computer program product runs on a computer, the computer is enabled to perform the foregoing related steps to implement the timing method for dealing with a link exception performed by the electronic device in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs at least one timing method for dealing with a link exception performed by the electronic device in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Another embodiment of this application provides a system. The system may include the core network device, the access network device, and at least one terminal device, and may be configured to implement the timing method for dealing with a link exception.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed in a plurality of different places. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A timing method for dealing with a link exception, wherein the method is performed at a core network device, and the method comprises:
   receiving a first synchronization packet from a first terminal device;
   receiving a second synchronization packet from a second terminal device or a server; and
   in response to the first synchronization packet and the second synchronization packet belonging to a same time sensitive network (TSN) domain, determining a to-be-forwarded synchronization packet in the first synchronization packet and the second synchronization packet, wherein
   the determining the to-be-forwarded synchronization packet is based on a clock address carried in the first synchronization packet and a clock address carried in the second synchronization packet.

2. The method according to claim 1, further comprising:
   determining that the first synchronization packet and the second synchronization packet belong to the same TSN domain in response to:
   a virtual local area network (VLAN) identifier (VID) carried in the first synchronization packet being the same as a VID carried in the second synchronization packet; or
   a TSN domain number carried in a packet header of the first synchronization packet being the same as a TSN domain number carried in a packet header of the second synchronization packet; or
   an address of the first terminal device carried in the first synchronization packet and an address of the second terminal device or the server carried in the second synchronization packet both belonging to the same TSN domain.

3. The method according to claim 1, wherein
   the clock address carried in the first synchronization packet is an address of a master clock, and the clock address carried in the second synchronization packet is an address of a standby clock; or
   the clock address carried in the first synchronization packet is an address of a standby clock, and the clock address carried in the second synchronization packet is an address of a master clock.

4. The method according to claim 1, wherein
   the determining the to-be-forwarded synchronization packet is based on a preconfigured filter template, and
   the preconfigured filter template comprises at least one of information about a master clock or information about a standby clock.

5. The method according to claim 4, wherein
   the information about the master clock comprises at least one of a source address or an internet protocol version 6 (IPv6) prefix of the master clock, and
   the information about the standby clock comprises at least one of a destination address or an IPV6 prefix of the standby clock.

6. The method according to claim 1, wherein
   a first time period is between a time point at which the second synchronization packet is received and a time point at which the 1st first synchronization packet is received, and
   the determining the to-be-forwarded synchronization packet comprises:
   in response to the first time period being greater than or equal to a preset time period, determining that the first synchronization packet is the to-be-forwarded synchronization packet.

7. The method according to claim 1, wherein before the determining the to-be-forwarded synchronization packet, the method further comprises:
   sending the first synchronization packet and the second synchronization packet to an access and mobility management function (AMF) network element; and
   receiving first indication information from the AMF network element, wherein the first indication information indicates that the first synchronization packet and the second synchronization packet are valid.

8. A core network device, comprising:
   a transceiver, configured to receive:
   a first synchronization packet from a first terminal device, and
   a second synchronization packet from a second terminal device or a server; and
   a processor, configured to:
   in response to the first synchronization packet and the second synchronization packet belonging to a same time sensitive network (TSN) domain, determine a to-be-forwarded synchronization packet in the first synchronization packet and the second synchronization packet, wherein the processor is configured to:
   determine, based on a clock address carried in the first synchronization packet and a clock address carried in the second synchronization packet, the to-be-forwarded synchronization packet in the first synchronization packet and the second synchronization packet.

9. The core network device according to claim 8, wherein the processor is further configured to determine that the first synchronization packet and the second synchronization packet belong to the same TSN domain in response to:
   a virtual local area network (VLAN) identifier (VID) carried in the first synchronization packet being the same as a VID carried in the second synchronization packet; or
   a TSN domain number carried in a packet header of the first synchronization packet being the same as a TSN domain number carried in a packet header of the second synchronization packet; or
   an address of the first terminal device carried in the first synchronization packet and an address of the second terminal device or the server carried in the second synchronization packet both belonging to the same TSN domain.

10. The core network device according to claim 8, wherein
- the clock address carried in the first synchronization packet is an address of a master clock, and the clock address carried in the second synchronization packet is an address of a standby clock; or
- the clock address carried in the first synchronization packet is an address of a standby clock, and the clock address carried in the second synchronization packet is an address of a master clock.

11. The core network device according to claim 8, wherein the processor is configured to:
- determine, based on a preconfigured filter template, the to-be-forwarded synchronization packet in the first synchronization packet and the second synchronization packet, wherein the preconfigured filter template comprises at least one of information about a master clock or information about a standby clock.

12. The core network device according to claim 11, wherein
- the information about the master clock comprises at least one of a source address or an internet protocol version 6 (IPv6) prefix of the master clock, and
- the information about the standby clock comprises at least one of a destination address or an IPV6 prefix of the standby clock.

13. The core network device according to claim 8, wherein
- a first time period is between a time point at which the second synchronization packet is received and a time point at which the 1st first synchronization packet is received, and
- the processor is configured to, in response to the first time period being greater than or equal to a preset time period, determine that the first synchronization packet is the to-be-forwarded synchronization packet.

14. The core network device according to claim 8, wherein the transceiver is further configured to:
- send the first synchronization packet and the second synchronization packet to an access and mobility management function (AMF) network element; and
- receive first indication information from the AMF network element, wherein the first indication information indicates that the first synchronization packet and the second synchronization packet are valid.

\* \* \* \* \*